US012315003B2

(12) United States Patent
Walker et al.

(10) Patent No.: US 12,315,003 B2
(45) Date of Patent: May 27, 2025

(54) METHODS AND SYSTEM FOR INTELLIGENT ITEM REORDERING USING AN ADAPTABLE MOBILE GRAPHICAL USER INTERFACE

(71) Applicant: Staples, Inc., Framingham, MA (US)

(72) Inventors: M. Steven Walker, Andover, MA (US); Ranjeet Sonone, San Jose, CA (US); Faisal Masud, Fall City, WA (US)

(73) Assignee: Staples, Inc., Framingham, MA (US)

( * ) Notice: Subject to any disclaimer, the term of this patent is extended or adjusted under 35 U.S.C. 154(b) by 0 days.

(21) Appl. No.: 17/816,653

(22) Filed: Aug. 1, 2022

(65) Prior Publication Data

US 2022/0366480 A1 Nov. 17, 2022

Related U.S. Application Data

(63) Continuation of application No. 16/425,413, filed on May 29, 2019, now Pat. No. 11,403,698.
(Continued)

(51) Int. Cl.
*G06Q 30/0601* (2023.01)
*G06F 9/451* (2018.01)
*G06Q 10/087* (2023.01)

(52) U.S. Cl.
CPC ......... *G06Q 30/0643* (2013.01); *G06F 9/451* (2018.02); *G06Q 10/087* (2013.01); *G06Q 30/0633* (2013.01)

(58) Field of Classification Search
CPC ...... G06Q 30/06; G06Q 10/08; G06Q 10/087; G06Q 30/0621; G06Q 30/0633–0635;
(Continued)

(56) References Cited

U.S. PATENT DOCUMENTS 2,788,131 A 4/1957 Bergstrom et al.
2,928,057 A 3/1960 Jarger
(Continued)

FOREIGN PATENT DOCUMENTS

CA 2788131 A1 8/2011
CA 2928057 A1 10/2016

OTHER PUBLICATIONS

Epstein, Curt. "Traxxall To Debut New Parts Inventory Tracking Software" AINOnline.com (Year: 2016).*
(Continued)

*Primary Examiner* — Kelly S. Campen
*Assistant Examiner* — Katherine A Barlow
(74) *Attorney, Agent, or Firm* — VLP Law Group LLP; Michel Bohn

(57) ABSTRACT

A system and method for intelligent item reordering using an adaptable mobile graphical user interface is described herein. In some instances, the system may generate a graphical user interface including a first set of graphical elements representing a first set of items, and receive a first input selecting a particular item of the first set of items, the first set of graphical elements including a graphical element representing the particular item. The system may generate a graphical list of quantities and render the graphical list of quantities at a first position in the graphical user interface based on the graphical element representing the particular item in the graphical user interface. In some instances, the system may receive a second input identifying a selected quantity from the graphical list of quantities and modify the graphical element representing the particular item to indicate the selected quantity.

20 Claims, 27 Drawing Sheets

Related U.S. Application Data

(60) Provisional application No. 62/677,664, filed on May 29, 2018.

(58) Field of Classification Search
CPC .. G06Q 30/0601–0643; G06Q 30/0641–0643; G06F 9/451; G06T 19/006
See application file for complete search history.

(56) References Cited

U.S. PATENT DOCUMENTS

| | | |
|---|---|---|
| 5,862,071 A | 1/1999 | Scholder |
| 5,960,411 A | 9/1999 | Hartman et al. |
| 6,473,739 B1 | 10/2002 | Showghi et al. |
| 6,678,268 B1 | 1/2004 | Francis et al. |
| 6,937,999 B1 | 8/2005 | Haines et al. |
| 6,985,877 B1 | 1/2006 | Hayward et al. |
| 7,030,731 B2 | 4/2006 | Lastinger et al. |
| 7,155,403 B2 | 12/2006 | Cirulli et al. |
| 7,246,746 B2 | 7/2007 | McNamara et al. |
| D551,038 S | 9/2007 | Evaimalo et al. |
| 7,589,616 B2 | 9/2009 | Klatsmanyi et al. |
| 7,698,169 B2 | 4/2010 | Raccah et al. |
| 7,870,041 B2 | 1/2011 | Henderson et al. |
| 7,881,987 B1 | 2/2011 | Hart et al. |
| 7,899,950 B2 | 3/2011 | Lorenzo et al. |
| 7,908,185 B2 | 3/2011 | Yeow et al. |
| 8,077,041 B2 | 12/2011 | Stern et al. |
| 8,126,784 B1 | 2/2012 | Agarwal |
| 8,161,119 B2 | 4/2012 | Pirzada et al. |
| 8,390,442 B2 | 3/2013 | Burns et al. |
| 8,636,208 B2 | 1/2014 | Urban et al. |
| 8,639,549 B2 | 1/2014 | Pathak et al. |
| 8,818,877 B2 | 8/2014 | Blanchard, Jr. et al. |
| 8,908,185 B2 | 12/2014 | Chen et al. |
| 8,924,262 B2 | 12/2014 | Shuster |
| 9,019,076 B2 | 4/2015 | Eckerdt |
| 9,036,792 B2 | 5/2015 | Cacioppo et al. |
| 9,269,022 B2 | 2/2016 | Rhoads et al. |
| D767,568 S | 9/2016 | McWilliam |
| 9,443,370 B2 | 9/2016 | Carson et al. |
| 9,514,589 B2 | 12/2016 | Raina et al. |
| 9,576,412 B2 | 2/2017 | Gudmundsson et al. |
| 9,602,172 B2 | 3/2017 | Jackson et al. |
| 9,633,493 B2 | 4/2017 | Raina et al. |
| 9,652,894 B1* | 5/2017 | Weekly ................. G06T 19/006 |
| 9,959,437 B1 | 5/2018 | Ramos et al. |
| 9,990,659 B2 | 6/2018 | Shanmugam et al. |
| 10,217,529 B2 | 2/2019 | Greco et al. |
| 10,285,003 B2 | 5/2019 | Burch et al. |
| 10,296,964 B1 | 5/2019 | Rausch et al. |
| 10,438,276 B2 | 10/2019 | Godsey et al. |
| 10,504,179 B1 | 12/2019 | McGuire et al. |
| 10,531,304 B2 | 1/2020 | Zeiler et al. |
| 10,542,382 B2 | 1/2020 | Good et al. |
| 10,573,134 B1 | 2/2020 | Zalewski et al. |
| 11,074,643 B1 | 7/2021 | Ellithorpe et al. |
| 11,308,537 B1* | 4/2022 | Bell ................... G06Q 30/0629 |
| 2002/0082042 A1 | 6/2002 | Mark et al. |
| 2003/0030568 A1 | 2/2003 | Lastinger et al. |
| 2004/0249727 A1* | 12/2004 | Cook, Jr. ........... G06Q 30/0641 |
| | | 705/26.81 |
| 2005/0065858 A1* | 3/2005 | Tenzer ................ G06Q 30/0623 |
| | | 705/26.61 |
| 2005/0128239 A1 | 6/2005 | Tanaka |
| 2007/0070831 A1 | 3/2007 | Schobben et al. |
| 2007/0106570 A1 | 5/2007 | Hartman et al. |
| 2007/0265935 A1* | 11/2007 | Woycik ..................... G07F 5/18 |
| | | 705/26.5 |
| 2010/0211636 A1 | 8/2010 | Starkenburg et al. |
| 2011/0295724 A1 | 12/2011 | Hill |
| 2012/0091162 A1 | 4/2012 | Overhultz et al. |
| 2012/0150677 A1 | 6/2012 | Shuster |
| 2012/0268236 A1 | 10/2012 | Eckerdt |
| 2012/0293551 A1* | 11/2012 | Momeyer ............. G06F 3/0488 |
| | | 345/174 |
| 2012/0305655 A1 | 12/2012 | Eckerdt |
| 2012/0330201 A1 | 12/2012 | Turner et al. |
| 2013/0151355 A1 | 6/2013 | Abromovitz et al. |
| 2013/0286046 A1 | 10/2013 | Rodriguez |
| 2013/0325672 A1* | 12/2013 | Odenheimer .......... G06Q 10/08 |
| | | 705/28 |
| 2014/0214547 A1 | 7/2014 | Signorelli et al. |
| 2014/0279188 A1 | 9/2014 | Powell et al. |
| 2014/0279297 A1 | 9/2014 | Morgan et al. |
| 2015/0016712 A1 | 1/2015 | Rhoads et al. |
| 2015/0149307 A1 | 5/2015 | Thukral |
| 2015/0164259 A1 | 6/2015 | Eckerdt et al. |
| 2015/0258458 A1 | 9/2015 | Zhang et al. |
| 2015/0302510 A1 | 10/2015 | Godsey et al. |
| 2015/0348146 A1 | 12/2015 | Shanmugam et al. |
| 2015/0382390 A1 | 12/2015 | Wong et al. |
| 2016/0019888 A1 | 1/2016 | Shigenaga et al. |
| 2016/0029148 A1 | 1/2016 | Jackson et al. |
| 2016/0055689 A1 | 2/2016 | Raina et al. |
| 2016/0055690 A1 | 2/2016 | Raina et al. |
| 2016/0055698 A1 | 2/2016 | Gudmundsson et al. |
| 2016/0148764 A1 | 5/2016 | Ruff |
| 2016/0196526 A1 | 7/2016 | Khalid et al. |
| 2016/0261917 A1 | 9/2016 | Trollope et al. |
| 2016/0314518 A1* | 10/2016 | Goodwin ........... G06Q 30/0641 |
| 2016/0371274 A1 | 12/2016 | Ng et al. |
| 2017/0083965 A1 | 3/2017 | Sun |
| 2017/0123596 A1* | 5/2017 | Kashima ................. G06F 3/048 |
| 2018/0068268 A1 | 3/2018 | Blumenau |
| 2019/0035010 A1* | 1/2019 | Ittah ................... G06Q 30/0643 |
| 2019/0114699 A1* | 4/2019 | Cook ................. G06Q 30/0621 |
| 2019/0244436 A1* | 8/2019 | Stansell ................ G06F 3/0482 |
| 2019/0295150 A1 | 9/2019 | High et al. |
| 2019/0318729 A1 | 10/2019 | Chao et al. |
| 2022/0036021 A1 | 2/2022 | Burchell et al. |
| 2024/0135436 A1 | 4/2024 | Walker et al. |

OTHER PUBLICATIONS

Porter, Michael E. et. al. "Why Every Organization Needs an Augmented Reality Strategy" Harvard Business Review. hbr.org (Year: 2017).*

ElMaraghy, H., et. al. "Product variety management" CIRP Annals, vol. 62, Issue 2, pp. 629-652, ISSN 0007-8506, https://doi.org/10.1016/j.cirp.2013.05.007. (Year: 2013).*

Vallerio, K. S., et. al. "Energy-efficient graphical user interface design," in IEEE Transactions on Mobile Computing, vol. 5, No. 7, pp. 846-859, Jul. 2006, doi: 10.1109/TMC.2006.97. (Year: 2006).*

Dachselt, R., et. al. Three-dimensional menus: A survey and taxonomy, Computers & Graphics, vol. 31, Issue 1, pp. 53-65, ISSN 0097-8493, https://doi.org/10.1016/j.cag.2006.09.006. (Year: 2007).*

Amazon Dash, Wikipedia, Wikimedia Foundation, en.wikipedia.org/wiki/Amazon_Dash, Jul. 29, 2018.

Amazondashbutton1, "Quick start guide for dash button device", Amazon.com, dates Apr. 3, 2015.

Amazondasbutton4, How Dash replenishment service works, Waybackmachine, dated Apr. 7, 2015.

Amazondashbutton5, "How does Amazon Dash button work", Quora.com, dated Apr. 1, 2015.

Amazondashbutton6, Fletcher, Gordon, "Amazon dash button is a first step towards internet of things that is actually useful", The Connection, dated Apr. 8, 2015.

Bond, Ronald L. "What You Need to Know About Managing Retail Inventory", Entrepreneur.com, 2013.

Freidman, Dick. "Inventory management tips", Supply House Times, 2016.

IBeacon for Logistics: A Use Case in Facilities, Asset, & Inventory Management, download from http://apsima.com/blog/ibeacon-for-logistics-facilities-asset-inventory-m- anagement/>, dated Apr. 17, 2015, (3 pages).

QStock, "Inventory Audit Checklist", QStock Inventory, dated Jun. 6, 2015.

Roberts, Emily, Introducing the Amazon Dash Button and Dash Replenishment Service, Appstore Blogs, https://developer.amazon.com/blogs/post/Tx3N3VXXO52B15l/Introduc, dated Mar. 31, 2015.

(56) References Cited

OTHER PUBLICATIONS

Sharifat, Amir, Flic—The Bluetooth Smart Button, Indiegogo, dated Nov. 19, 2017, www.indiegogo.com/products/flic-the-bluetooth-smart-button.

StickNFind enterprise grade beacons helps streamline the process of monitoring, maintaining and managing the organization's valuable property that keep an organization running, downloaded from https://www.sticknfind.com/enterprise.aspx>, Apr. 17, 2015 (6 pages).

Williams, David. "QuickBooks Introduces New Reorder Points that Tell When Inventory is Running Low" Small Business Trends, SmallBizTrends.com, 2017.

Amazondashbutton 1, "Quick start guide for Dash Button Device", Amazon .com, dated Apr. 3, 2015 (Year: 2015).

Amazondashbutton2, "Place it. Press it. Got it", Waybackmachine, dated Apr. 20, 2015.

Amazondashbutton3, Pierce, David, "Amazon is going to let your gadgets order groceries automatically", Wired, dated Mar. 31, 2015.

Amazondashbutton4, "How dash replenishment service works", waybackmachine, dated Apr. 7, 2015. (Year: 2015).

Amazondashbutton5, "Hoe does Amazon Dash button work", Quora.com, dated Apr. 1, 2015 (Year: 2015).

Amazondashbutton6, Fletcher, Gordon, "Amazon Dash is a first step towards internet of things that is activity useful", The Connection, dated Apr. 8, 2015.

IBeacon for Logistics: A Use Case in Facilities, Asset, & Inventory Management, download from http://apsima.com/blog/ibeacon-for-logistics-facilities-asset-inventory-m- anagement/> Apr. 17, 2015 (3 pages).

Qstock, "Inventory Audit Checklist", QStock Inventory, dated Jun. 6, 2015 (Year: 2015).

StickNFind enterprise grade beacons helps streamline the process of monitoring, maintaining and managing the organization's valuable property that keep an organization running, download from https://www.sticknfind.com/enterprise.aspx> Apr. 17, 2015 (6 pages).

\* cited by examiner

500d 18
19
20
21
22
23
24
25

528

520

Expected Delivery Date:
12/10/2019

$12.99

Brand Y Recycled Note Pad
6 x 9, 12/Pack

Send Reminder

Comment

Remove From Order

Zones   DONE

ADD NEW

Basement Supplies
2 West Kitchen
2 West Supplies
2 East Kitchen
2 East Supplies
3 West Kitchen
3 West Supplies
3 East Kitchen
3 East Supplies
4 Conference
4 West Supplies

Manage Panels

Coffee & Teas
Beverages
Snacks
Writing 
Desk
Print & Paper
Cleaning
Facility
Everything Else

METHODS AND SYSTEM FOR INTELLIGENT ITEM REORDERING USING AN ADAPTABLE MOBILE GRAPHICAL USER INTERFACE

BACKGROUND

The present disclosure relates to technology for, among other things, providing intelligent item tracking and expedited item reordering by stakeholders. Some implementations relate to an adaptable mobile graphical user interface for facilitating item ordering.

Stock rooms, kitchens, and other similar facilities often stock large numbers of items. Some items are consumed and replaced on a regular basis, while others wear out and are replaced sporadically. Currently, individuals, such as facilities managers, review the stock of items in a stock room, manually calculate which items and how many of each item to order to keep the stock rooms stocked. Typically, individuals use a pen and paper to take notes and then manually review the notes to find the items on a computer or in a catalog. This manual review and re-order process can be extremely time consuming and inaccurate. For instance, in some larger buildings with multiple stock rooms, closets, or kitchens, a facilities manager may expend dozens of hours per week just maintaining inventory.

More recently, solutions have attempted to address the limitations of manual reordering through automatic delivery subscriptions or dedicated ordering devices. Automatic delivery subscriptions often result in an over or understock of items as usage can be variable and unpredictable, and subscriptions fail to address new or irregularly ordered items.

SUMMARY

According to one innovative aspect of the subject matter described in this disclosure, a system may include: A computer-implemented method including: generating, by a computing device, a graphical user interface including a first set of graphical elements representing a first set of items; receiving, by the computing device, a first input selecting a particular item of the first set of items, the first set of graphical elements including a graphical element representing the particular item; generating, by the computing device, a graphical list of quantities; rendering, by the computing device, the graphical list of quantities at a first position in the graphical user interface based on the graphical element representing the particular item in the graphical user interface; receiving, by the computing device, a second input identifying a selected quantity from the graphical list of quantities; and modifying, by the computing device, the graphical element representing the particular item to indicate the selected quantity.

Implementations may include one or more of the following features. The computer-implemented method further including: determining, by the computing device, a recommended quantity of the particular item based on a history associated with the particular item and an account associated with the computing device; and generating, by the computing device, the graphical list of quantities based on the recommended quantity. The computer-implemented method where the graphical list of quantities is rendered in numerical order, and the recommended quantity is rendered closer to the graphical element representing the particular item in the graphical user interface than other quantities in the graphical list of quantities. The computer-implemented method further including: identifying, by the computing device, the first set of items corresponding to a first zone using a history associated with the first zone, the first zone indicating an area at a location. The computer-implemented method further including: determining, by the computing device, the first zone of the location using a beacon located at the location, the beacon transmitting a signal received by the computing device to determine the first zone.

Implementations may further include the following features. The computer-implemented method where the first input selecting the particular item is received from the beacon, the beacon including a button that, when actuated, transmits a signal to the computing device including the first input. The computer-implemented method where modifying the graphical element representing the particular item to indicate the selected quantity includes overlaying a number representing the selected quantity over the graphical element representing the particular item. The computer-implemented method further including modifying, by the computing device, the graphical element representing the particular item to indicate an order status of the particular item including overlaying a graphical representation of the order status over the graphical element representing the particular item. Implementations of the described techniques may include hardware, a method or process, or computer software on a computer-accessible medium.

The features and advantages described herein are not all-inclusive and many additional features and advantages will be apparent to one or ordinary skill in the art in view of the figures and description. Moreover it should be noted that the language used in the specification has been selected for readability and instructional purposes and not to limit the scope of the inventive subject matter.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

The technology disclosed in this application allows stakeholders, such as a person responsible for ordering and reordering items for an organization (e.g., business, family, etc.), to conveniently and easily track and reorder the items. The technology may include one or more ordering devices and graphical user interfaces configured to facilitate ordering or reordering of products. In some implementations, the technology disclosed in this application allows users to easily and conveniently (re)order items via an online marketplace using an adaptable mobile graphical interface and, in some instances, a physical beacon or button for identifying a zone or area associated with an organization and/or a particular item.

The features and advantages described herein are not all-inclusive and many additional features and advantages are within the scope of the present disclosure. Moreover, it should be noted that the language used in the present disclosure has been principally selected for readability and instructional purposes, and not to limit the scope of the subject matter disclosed herein.

The technology described herein provides for an efficient and adaptable mobile graphical interface for quickly reordering items, tracking reorders, providing analytics, etc., as described below. The communication performed by the technology, such as the systems, methods, devices, and other aspects, can provide numerous advantages, such as simplifying ordering of items for restocking stock rooms and/or providing for an automatic inventory management system of an organization. For instance, the arrangement, progress, and use of the graphical user interfaced generated by the technology may take advantage of the attributes of mobile devices, such as their wireless radios and touch screens, while addressing the limitations of the mobile devices, such as the limited screen size and text entry ability.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

Figure 1:
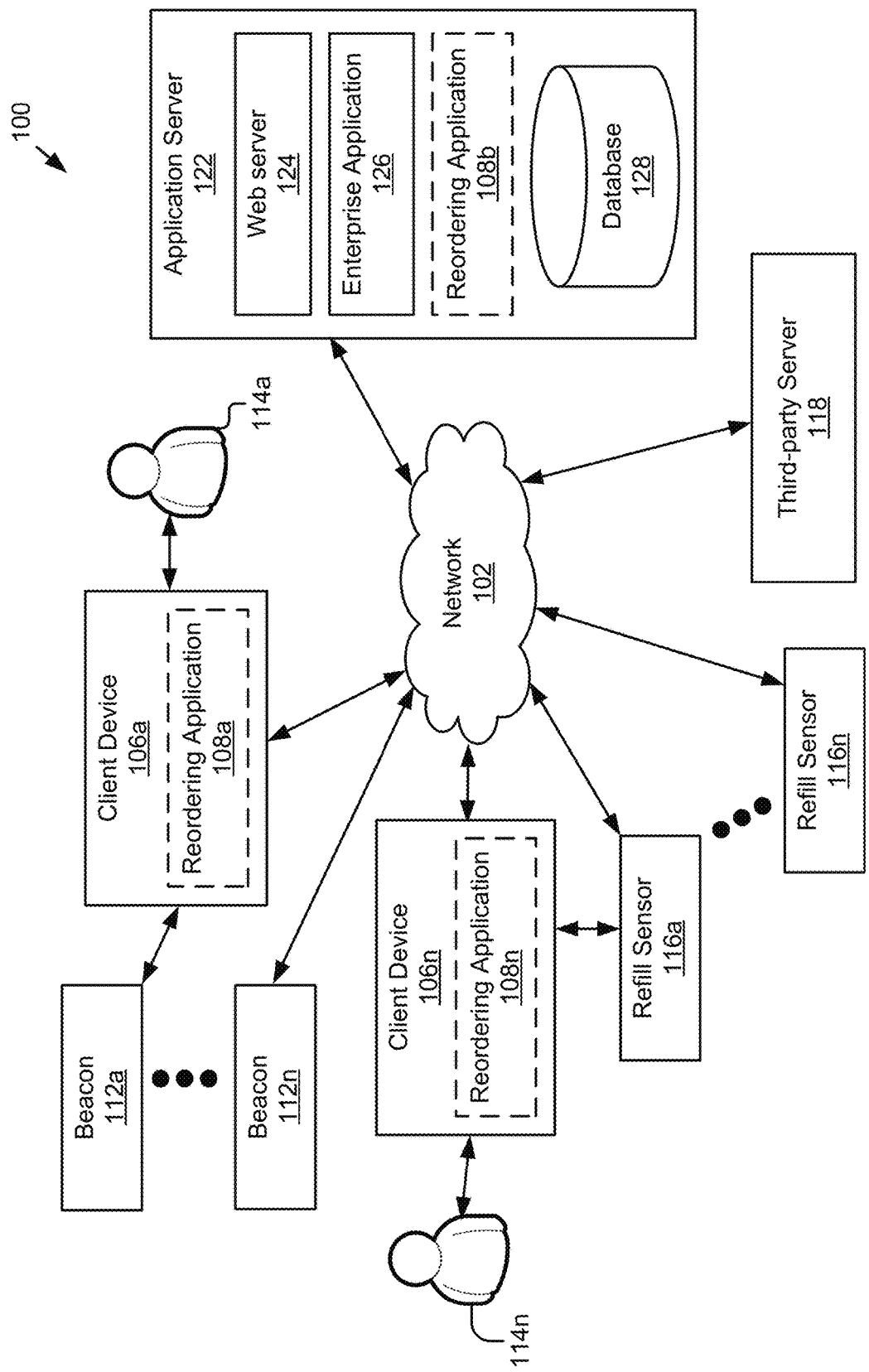
FIG. 1 is a block diagram of an example system for intelligent item reordering using an adaptable mobile graphical user interface.

FIG. 1 is a block diagram of an example system 100 for intelligent inventory tracking and restocking using an adaptable mobile graphical user interface. The illustrated system 100 may include client devices 106a . . . 106n, which may run reordering applications 108a . . . 108n, a third-party server 118, refill sensors 116a . . . 116n, buttons or beacons (referred to herein as beacons) 112a . . . 112n, and an application server 122, which are electronically communicatively coupled via a network 102 for interaction with one another, although other system configurations are possible including other devices, systems, and networks. For example, the system 100 could include any number of client devices 106, beacons 112, refill sensors 116, third-party servers 118, application servers 122, and other systems and devices.

The network 102 may include any number of networks and/or network types. For example, the network 102 may include, but is not limited to, one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The client device 106 includes one or more computing devices having data processing and communication capabilities. The client device 106 may couple to and communicate with other client devices 106 and the other entities of the system 100 via the network 102 using a wireless and/or wired connection, such as the application server 122. In some implementations, the client device 106 may also be configured to directly with devices, such as beacons 112 or refill sensors 116 (e.g., via Bluetooth or Wi-Fi). Examples of client devices 106 may include, but are not limited to, mobile phones, tablets, laptops, desktops, netbooks, server appliances, servers, virtual machines, TVs, etc. The system 100 may include any number of client devices 106, including client devices 106 of the same or different type.

A plurality of client devices 106a . . . 106n are depicted in FIG. 1 to indicate that the application server 122 and its components may aggregate information about and provide data associated with the systems and processes described herein to a multiplicity of users 114a . . . 114n on a multiplicity of client devices 106a . . . 106n. In some implementations, a single user 114 may use more than one client device 106, which the application server 122 may use to track and aggregate interaction data associated with the user 114 through a variety of different channels including online, physical, and phone (e.g., text, voice, etc.) channels, as discussed elsewhere herein. In some implementations, the application server 122 may communicate with and provide information to a client device 106 of a manager of an organization to track orders and inventory among a plurality of stock rooms, closets, kitchens, etc., as well as provide real-time status and analytics information regarding the stock of items as well as the restocking process. For instance, the application server 122 may send data, such as graphical user interfaces, receipts, and confirmation messages, etc., to a reordering application 108a . . . 108n on a client device 106a . . . 106n.

A client device 106 may establish or maintain a wired or wireless connection with the beacons 112 and/or refill sensors 116 via the communication unit of the client device 106. In some implementations, the connection with the beacon(s) 112 may be established via a beacon holder 402, as described in reference to FIG. 4. For example, the client device 106 may include one or more communication units (e.g., Bluetooth radios) configured to communicate with a communication unit (e.g., a Bluetooth radio) of one or more of the beacons 112 and/or beacon holder 402.

The refill sensor 116 may include a computing device having one or more communication units (e.g., as described in reference to FIG. 6) for communicating a client device 106, network 102, and/or application server 122. The refill sensor 116 may include a processor, a memory, and an output device, although additional or fewer components are possible depending on the implementation. The refill sensor 116 may include a non-transitory memory storing instructions that, when executed by the processor, cause the refill sensor 116 to perform operations described herein.

In some implementations, the refill sensor 116 may be an IoT (Internet of Things) device that senses stock levels of various items and provide usage and level information to the enterprise application 126 and/or reordering application 108. For instance, the refill sensor 116 may be placed in a stock room, closet, bathroom, kitchen, or another physical location with inventory that may be replenished. In some implementations, the refill sensor 116 may include a weight, volume, camera, position, etc., sensor to detect a quantity of an item present at a given location. For example, the refill sensor 116 may track the amount of soap, paper towels, or toilet paper in a bathroom. In another example, a refill sensor 116 may be a button (e.g., a beacon 112) that may be actuated each time a consumable item is used, thereby tracking the usage and/or inventory level of the item.

In some implementations, the beacons 112a . . . 112n may include hardware devices which may generate a signal, for example, in response to being actuated or pressed or being within a range of a device, such as a client device 106. For instance, in response to receiving a signal from the client device 106 pinging the beacons 112, the beacons 112 may respond by transmitting with their ID(s). In some implementations, a beacon 112 may transmit a signal including a beacon ID in response to receiving an input actuating the beacon 112. In some implementations, a beacon 112 may include a wireless radio (e.g., Bluetooth, Near Field Communication, RFID, etc.) that may generate and transmit a signal to the client device 106 and/or application server 122 indicating that a button of the beacon 112 has been actuated. Alternatively or additionally, a beacon 112 may have a wired/electrical contact based connection configured to transmit the signal from the beacon 112 to a beacon holder 402, which in turn connects to the client device 106 and/or enterprise application 126, as described herein.

A beacon 112 may, in some implementations, also include a battery and a microchip for performing basic processing operations, such as programmably receiving, storing, and transmitting an identification code (button ID), item type, action type, and/or connecting to another computing device. In some implementations, the beacon 112 may include a button that may be actuated to transmit a signal, for instance, for identifying a zone or selecting an item, as described in further detail below. In some implementations, a beacon 112 may be externally powered and configured to, for example, in response to receiving the external power, transmit its ID. For instance, the beacon 112 may receive a current via one or more electrical contacts, which powers an internal circuit of the battery, which internal circuit may send (e.g., via the electrical contacts) the beacon's ID to the beacon holder 402 or client device 106, for example, as described in further detail below.

A set of beacons/buttons 112 representing the specific inventory or order pattern of items of a particular stock room, user, company, account, etc., can be used in a particular zone (e.g., a particular stock room, kitchen, etc.). For example, company 1 may have a stock room where items A, B, and C are stocked and regularly ordered (e.g., ordered from a store, second stock room, inventory center, or fulfillment center), but company 2 may have a stock room where items B, D, E, and F are stocked and regularly ordered. In this example, 3 beacons 112 respectively mapped to items A, B, and C may be placed in a first zone associated with a company, and 4 beacons 112 may be mapped to items B, D, E, and F may be placed in a second zone. The beacons 112 may identify to a device, such as the client device 106, the location of the device in a particular zone and/or specific items that may be restocked in that zone.

In some implementations, a button of a beacon 112 (or a beacon holder 402 coupled with a beacon 112) may transmit a signal to the client device 106 or application server 122 indicating that the button of the beacon 112 has been actuated. The signal may include, for example, a button ID, the number of times the button was pressed (e.g., within a defined time period), the duration of a button press, a time/date when the button was pressed, etc.

The application server 122 may include a web server 124, an enterprise application 126, a reordering application 108, and a database 128. In some configurations, the enterprise application 126 and/or reordering application 108b may be distributed over the network 102 on disparate devices in disparate locations or may reside on the same locations, in which case the client device 106a and/or the application server 122 may each include an instance of the reordering application 108 and/or portions thereof. The client devices 106 may also store and/or operate other software such as a reordering application 108, an operating system, other applications, etc., that are configured to interact with the application server 122 via the network 102.

The application server 122 and the third-party server 118 have data processing, storing, and communication capabilities, as discussed elsewhere herein. For example, the servers 122 and/or 118 may include one or more hardware servers, server arrays, storage devices and/or systems, etc. In some implementations, the servers 122 and/or 118 may include one or more virtual servers, which operate in a host server environment.

In some implementations, the enterprise application 126 may receive communications from a client device 106 and/or beacon 112 in order to place orders for restocking a stock room, closet, zone, or other facility. The enterprise application 126 may receive information and provide information to the reordering application 108 to generate the adaptable graphical interfaces described herein, as well as perform and provide analytics and other operations. In some implementations, the enterprise application 126 may perform additional operations and communications based on the information received from client devices 106, as described elsewhere herein.

The database 128 may be stored on one or more information sources for storing and providing access to data, such as the data storage device 608. The database 128 may store data describing beacons 112, refill sensors 116, client devices 106, instances of the reordering application 108, customers, items, inventories, preferences, etc. For instance, the database 128 may store a mapping of beacons 112 (e.g., IDs) to particular items available from a first or third party vendor (e.g., via the third-party server), or other data. The mappings of the beacons 112 may be stored in a table or other type of database, as described below. Similarly, the database 128 may store preferred items, previously ordered items, previously ordered quantities, recommended quantities, etc., corresponding to categories of items, zones in a facility, facilities, client preferences, etc.

The database 128 may store other information relative to beacons 112 (e.g., battery, connection status, associated account information, etc.), client devices 106, stock rooms, payment information, customer profiles, order histories, customer preferences, etc. For example, the database 128 may track types, quantities, frequency, etc., of items ordered via a particular instance of the reordering application 108, beacon 112, zone, category, user, or company. The database 128 may also or alternatively store other data relevant to the operation of the system 100, as described throughout this disclosure.

A third-party server 118 can host services such as a third-party application (not shown), which may be individual and/or incorporated into the services provided by the application server 122.

It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2A:
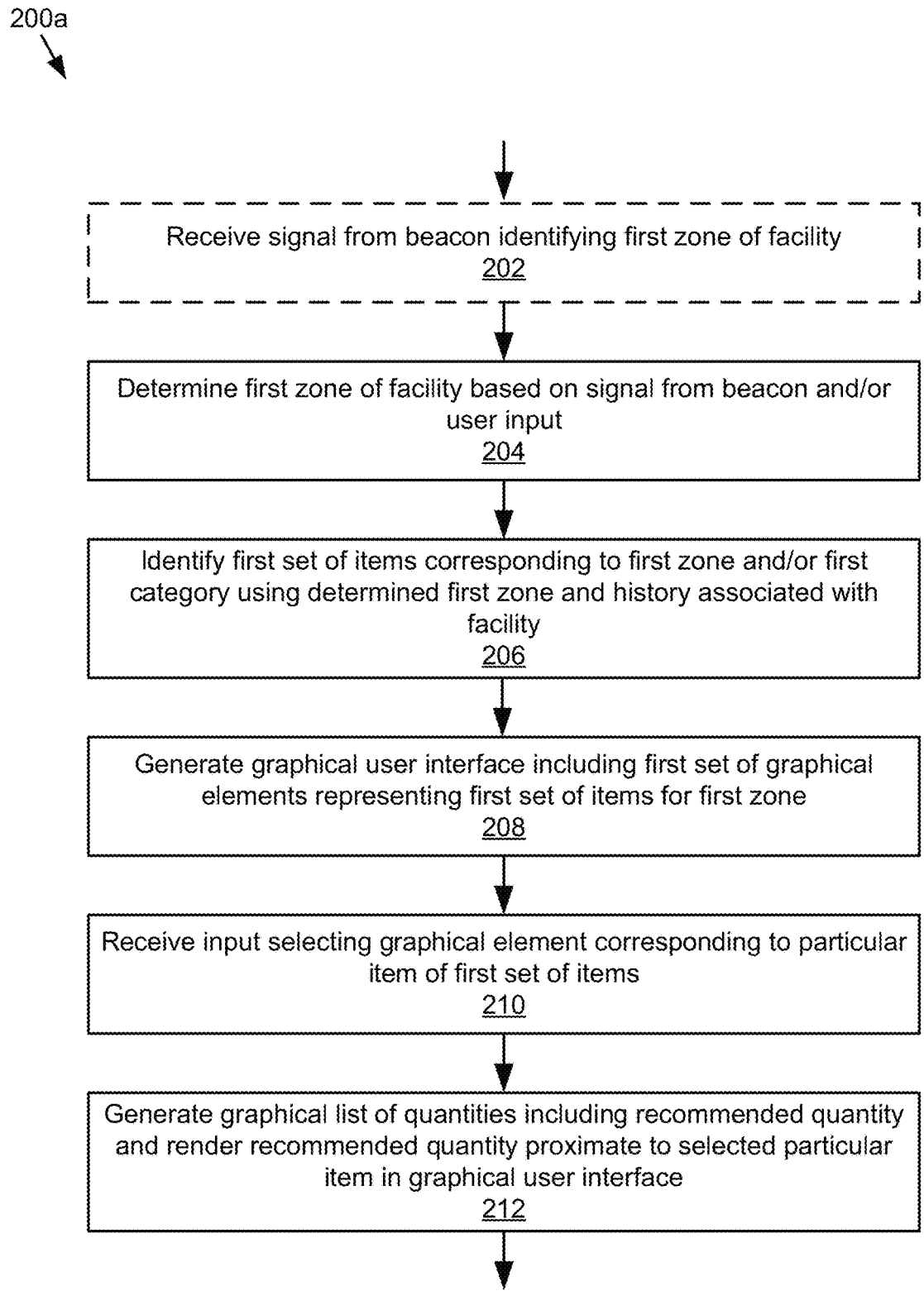
FIGS. 2A-2C are flowcharts of an example method for intelligent item reordering using an adaptable mobile graphical user interface.
Figure 2B:
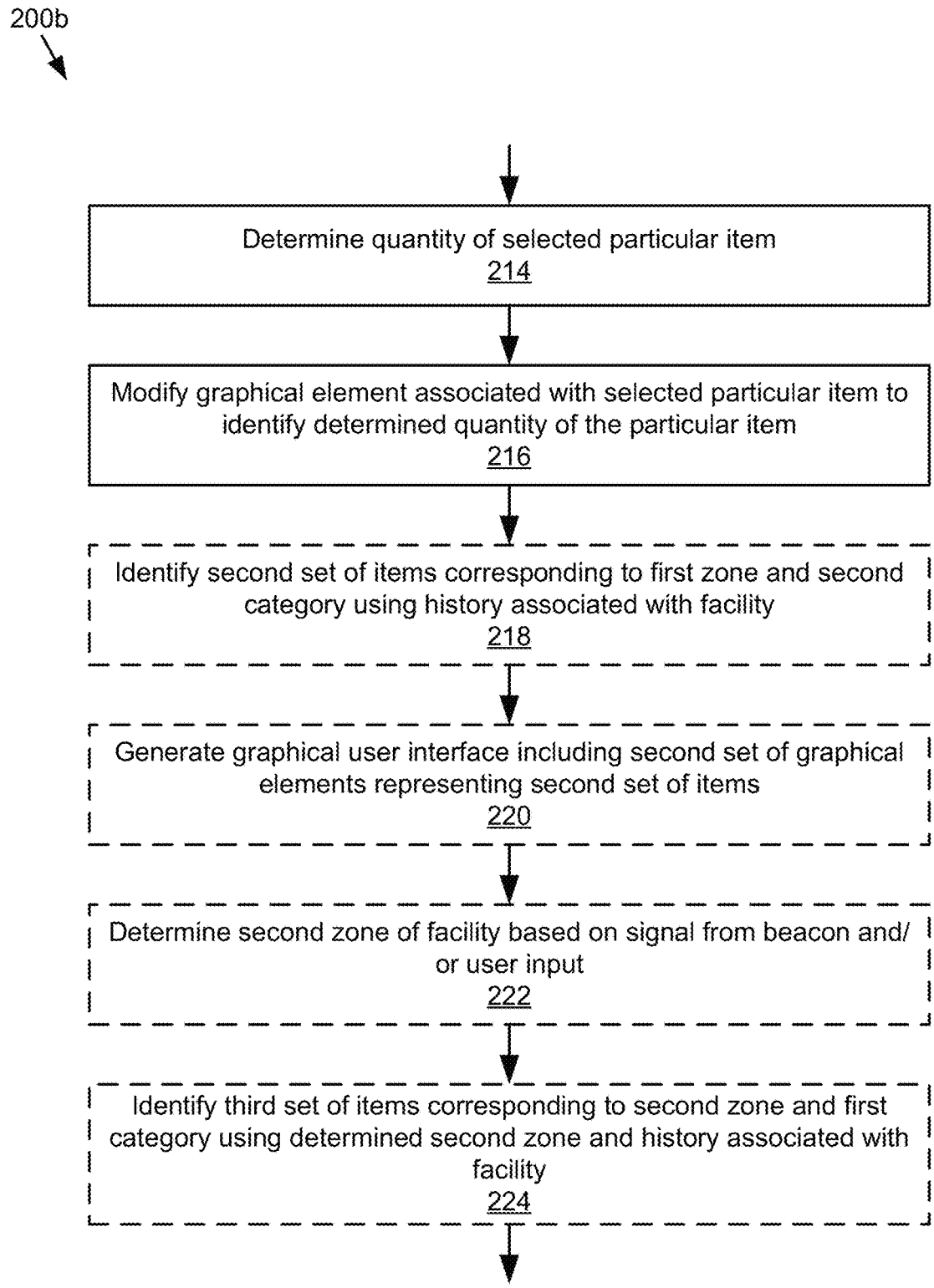
Figure 2C:
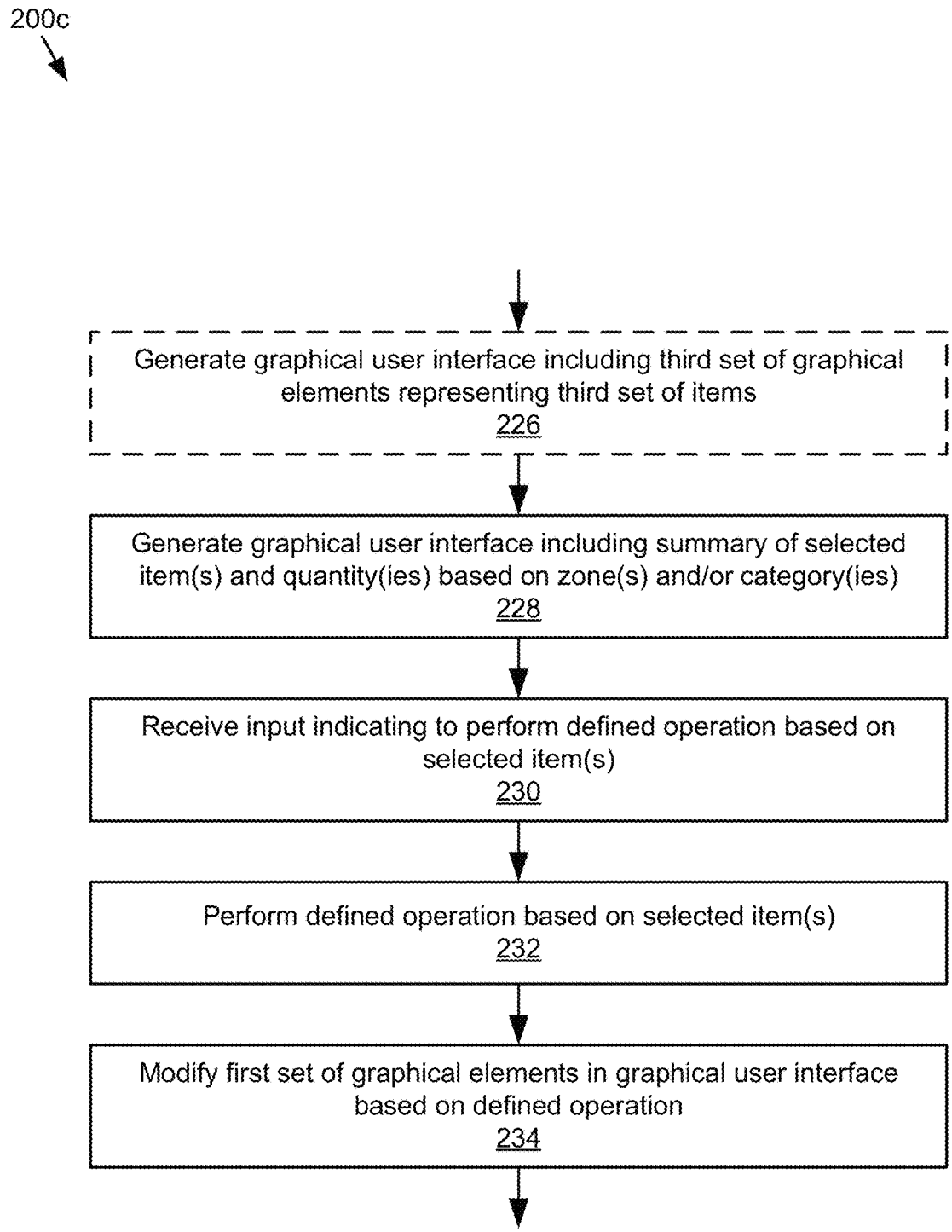

FIGS. 2A-2C are flowcharts of an example method 200a, 200b, and 200c for intelligent item reordering using an adaptable mobile graphical user interface.

In some implementations, at 202, the reordering application 108 may receive a signal from a beacon 112 identifying a first zone of a facility, such as a particular stock room, kitchen, etc., in a building. For example, as described above, a user may enter a particular stock room in a building, which may correspond with a defined zone. In some implementations, the user may actuate a button of a beacon 112, which may transmit a signal to the reordering application 108 an ID, which identifies the zone and/or an item in the zone to the reordering application 108. In some implementations, the beacon 112 may automatically, or in response to a ping from a client device 106, transmit its ID to identify the location (e.g., the zone) at which the beacon 112 and therefore the client device 106 is located.

At 204, the reordering application 108 may determine the first zone of the facility based on the signal from the beacon 112 and/or a user input. In some implementations, as described above the signal from the beacon 112 may include a beacon or button identification code (ID) which is mapped to an item on a database accessible to the reordering application 108. For instance, the reordering application 108 may communicate with the enterprise application 126 (e.g., via the web server 124) to identify the item and/or zone mapped to the ID. In some implementations, the reordering application 108 may receive a user input selecting a zone. For example, the graphical user interface 500a illustrated in FIG. 5A includes a graphical element 502 that may be selected to select a particular zone. Similarly, the graphical user interface 500o illustrated in FIG. 5O may be used to select a particular zone. Other implementations are possible and contemplated herein.

In some implementations, the reordering application 108 may determine or identify a zone in which the client device 106 is located at a location or facility based on a beacon or button 112 located at the zone. For instance, as described in reference to 202, the beacon 112 may transmit a wireless signal, which may be received by the client device 106 to determine the zone and, in some instances, automatically surface a set of items associated with the zone on the graphical user interface.

At 206, the reordering application 108 may identify a first set of items corresponding to the first zone and/or a first category using the determined first zone and, in some instances, a history associated with the facility, first zone, user account, client device 106, and/or reordering application 108, for example. A zone may indicate an area at a location such as facility or building. In some implementations, the reordering application 108 may identify a set of items corresponding to a given zone using a history associated with the zone.

In some implementations, the reordering application 108 may communicate with the enterprise application 126 to retrieve previously ordered or configured items in a particular category and zone. In some implementations, data about the items may also include images, names, or sub-categories associated with each item, which may be used to identify the item in the graphical user interface.

At 208, the reordering application 108 may generate a graphical user interface including a first set of graphical elements representing the first set of items for the first zone and/or category of items. An example graphical interface illustrating a set of items associated with a particular zone and a category of items in that zone is described and illustrated in reference to FIG. 5A, as well as other figures, below. For instance, the set of graphical elements may illustrate virtual buttons and may, in some instances, be optimized for a mobile interface to take advantage of a touch interface while also improving usability on a device with a limited screen size.

At 210, the reordering application 108 may receive an input selecting a graphical element corresponding to a particular item of first set of items. For instance, the reordering application 108 may receive a first input selecting a particular item of the first set of items. The first set of graphical elements may include a graphical element representing the particular item, which may be selected in the graphical user interface. For instance, in the example described and illustrated in reference to FIG. 5A, the input may select a graphical element 506.

In some implementations, the input selecting the particular item may be received from the beacon 112. For instance, beacon 112 may include a button that, when actuated, transmits a signal including the input to the client device 106. For example, as described above, a user may actuate the button, which causes the beacon to transmit a button ID to the client device 106 (e.g., directly or via a beacon holder 402, network 102, or application server 122). The reordering application 108 may identify the item based on the button ID and select a graphical representation of the item in the graphical user interface.

At 212, the reordering application 108 may generate a graphical list of quantities including a recommended quantity and, in some implementations, may render the recommended quantity proximate to selected particular item in graphical user interface. For instance, the reordering application 108 may render the graphical list of quantities at a first position in the graphical user interface based on the graphical element representing the particular item in the graphical user interface. Example operations for determining and rendering the recommended item and graphical list of quantities is described in reference to FIG. 3. In some implementations, the reordering application 108 may also determine item details, ordering or shipping information, analytics information, or other information, which it may display with the graphical list in response to a virtual button of an item being selected. Example graphical lists of quantities/numbers and additional item details are described and illustrated in reference to FIGS. 5B and 5D.

At 214, the reordering application 108 may determine quantity of the selected particular item. For instance, the reordering application 108 may receive a user input selecting a graphical element of the graphical user interface representing the quantity (e.g., from a graphical list of numbers/quantities), although, in some implementations, the user input may include a button actuation of a beacon 112 (e.g., as described in reference to FIG. 4) or a verbal input into a microphone communicatively coupled with the client device 106, for example.

Figure 5A:
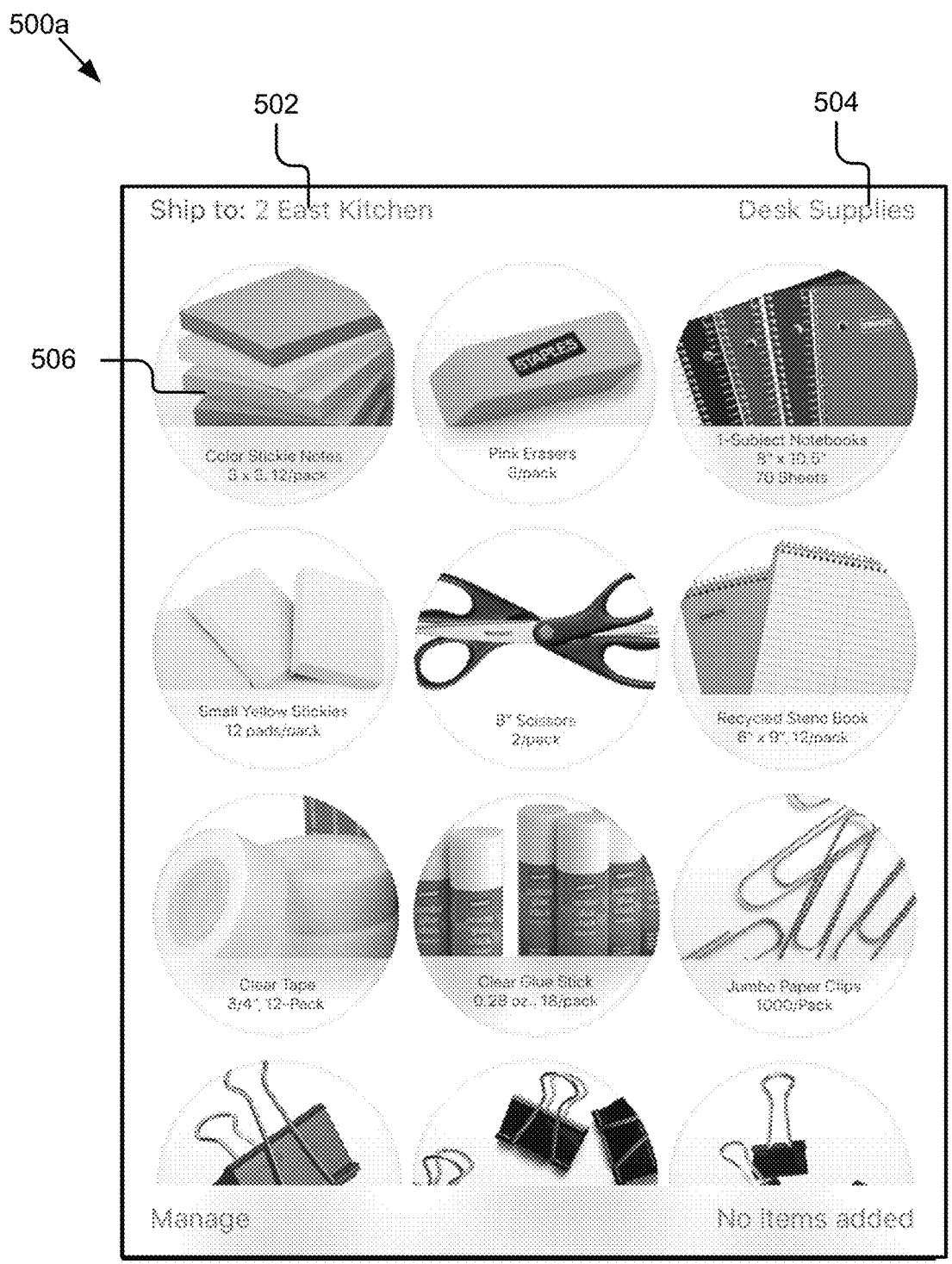
FIGS. 5A-5T are example adaptable mobile graphical interfaces for intelligent item reordering.
Figure 5B:
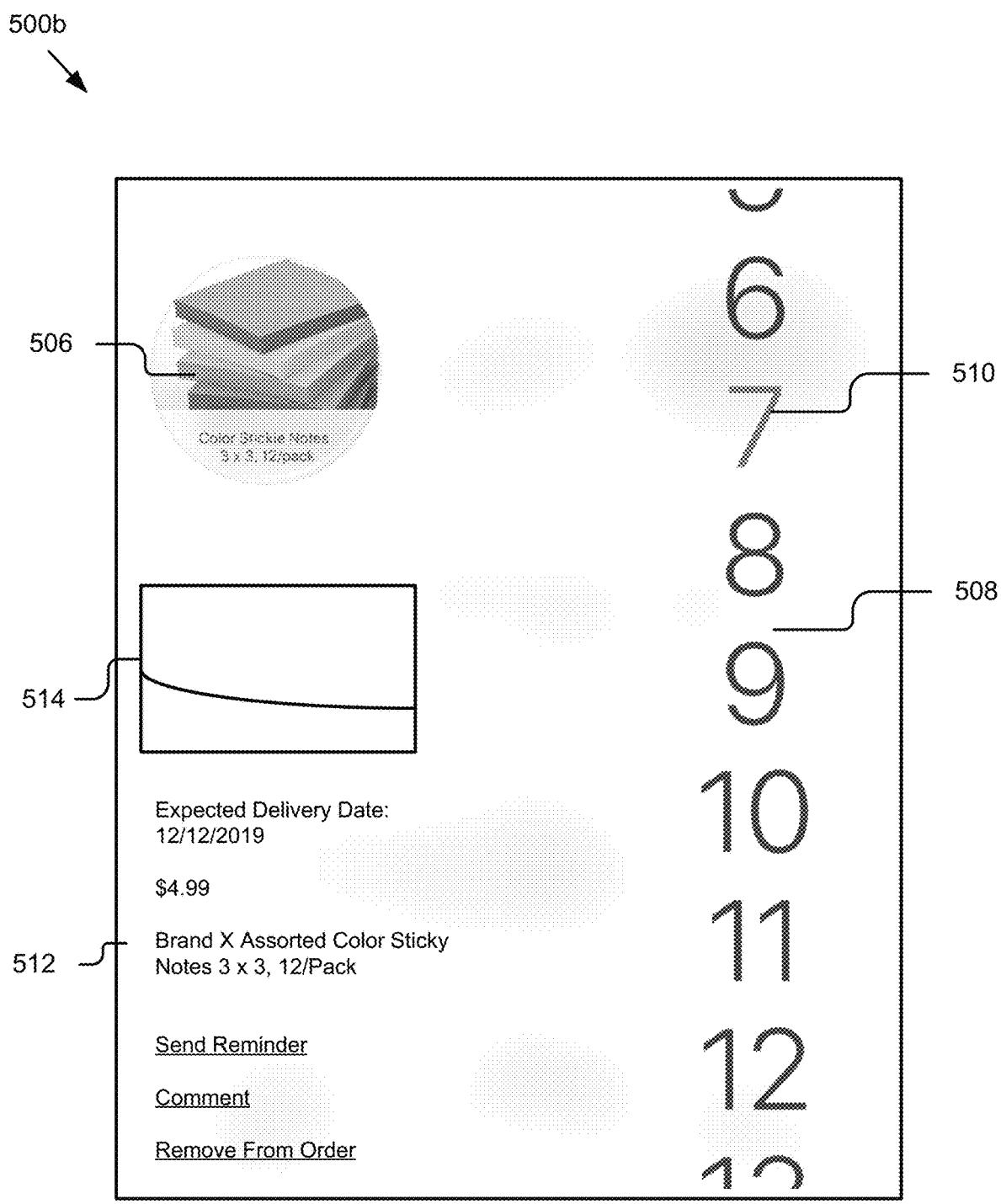
Figure 5C:
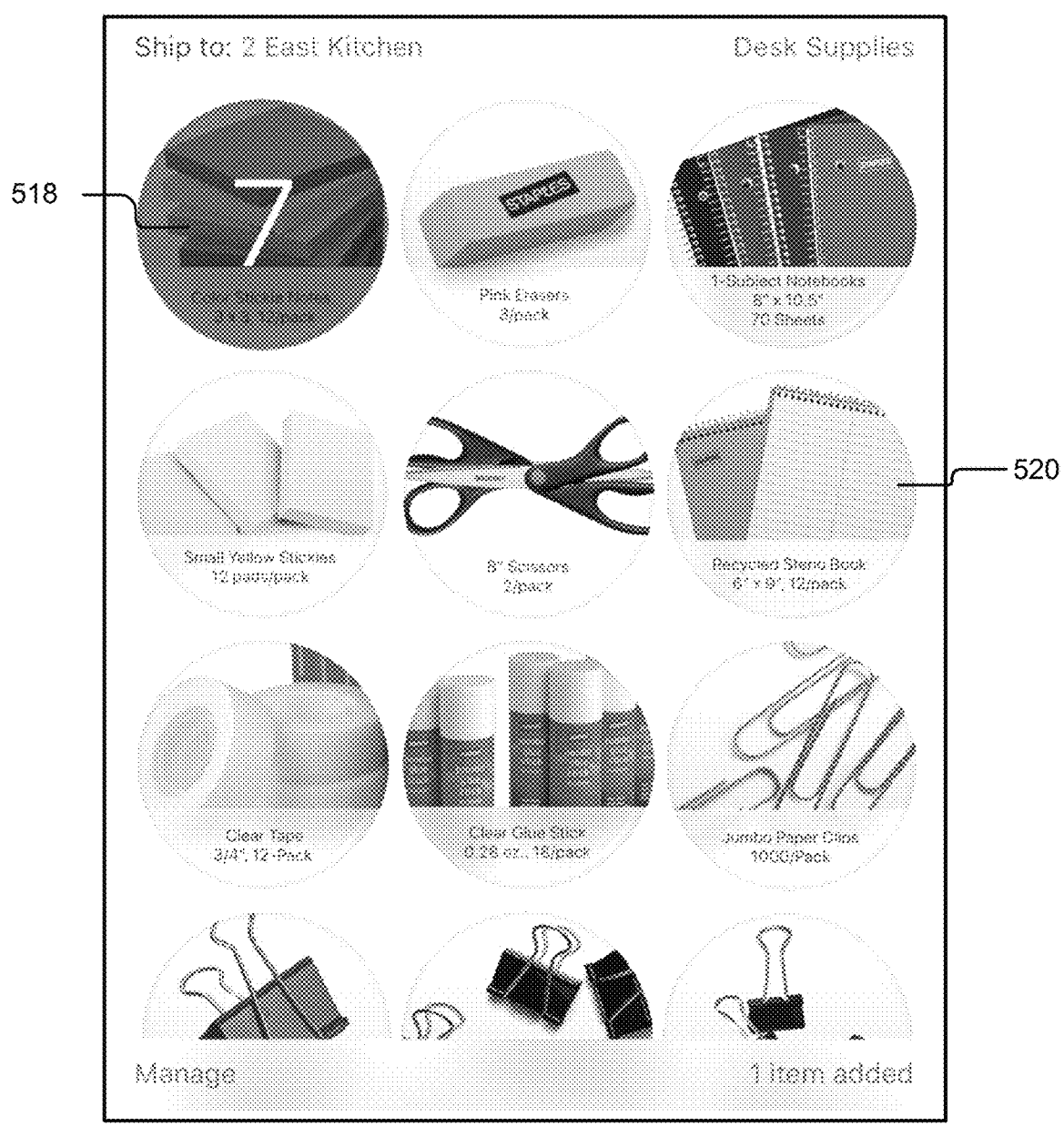

At 216, the reordering application 108 may modify the graphical element associated with the selected particular item to identify the selected quantity of the particular item. In some implementations, the reordering application 108 may modify the graphical element representing the particular item to indicate the selected quantity, for example, by overlaying a number representing the selected quantity over the graphical element representing the particular item, although other implementations are possible. An example implementation of modifying the graphical element associated with the particular item is illustrated in FIG. 5C, among other figures, in which the graphical element 508 representing the selected item is grayed out with an overlaid number 7 (e.g., the selected quantity).

At 218, the reordering application 108 may identify a second set of items corresponding to the first zone and a second category, for example, a history associated with the facility, first zone, user account, client device 106, and/or reordering application 108. For instance, as illustrated in FIG. 5A, graphical element 504 may represent the category of items displayed and may be selectable to select a category. In some instances, a user may swipe across a display of the client device 106 with a sideways gesture to move to the next category. For instance, FIG. 5F illustrates a graphical user interface 500f transitioning from a desk supplies category to a writing category. In some implementations, each zone may have a specific defined set of categories of items. For instance, a kitchen zone may have food, utensils, and cooking supplies categories, while a supply closet may have a desk supplies and writing categories. Accordingly, in some implementations the categories for which the set of items is identified may be determined based on the selected zone.

In some implementations, an actuation of a button of a beacon 112, where the item corresponding to the beacon 112 is in a category other than that currently displayed on the graphical user interface by the reordering application 108, may automatically cause the graphical user interface to select and display graphical user interface with the category associated with the beacon 112. For instance, the reordering application 108 may receive the beacon ID, determine a zone and/or category associated with the beacon ID, and display the determined zone and/or category.

At 220, the reordering application 108 may generate a graphical user interface (and/or update the existing graphical user interface) including a second set of graphical elements representing the second set of items. For example, the reordering application 108 may render the set of graphical elements associated with the items in the second category and/or zone, for example, as illustrated in FIG. 5G.

In some implementations, at 222, the reordering application 108 may determine a second zone of the facility based on a signal from second beacon and/or a user input into the graphical user interface, for example, as described in reference to 204 above, as well as FIGS. 5O, and 5P, etc., below.

At 224, the reordering application 108 may identify third set of items corresponding to the second zone and/or the first category based on the second zone and, in some instances, a history associated with the facility, first zone, user account, client device 106, and/or reordering application 108, for example. At 226, the reordering application 108 may generate a graphical user interface (and/or update the existing graphical user interface) including a third set of graphical elements representing the third set of items. For example, the reordering application 108 may determine the set of items for the new zone and render graphical elements as described in reference to 206 and 208.

In some implementations, at 228, the reordering application 108 may generate a graphical user interface including a summary of selected item(s) and quantity(ies) based on the zone(s) and/or category(ies), as described above. For instance, example summaries are described an illustrated in reference to FIGS. 5J, 5K, 5L, 5O, and/or 5P.

At 230, the reordering application 108 may receive an input directing the reordering application 108 to perform a defined operation based on selected item(s) and quantities, and, at 232, the reordering application 108 may perform the defined operation based on the selected item(s) and quantities. In some implementations, the reordering application 108 may transmit an instruction to the enterprise application 126 to order the items at the quantities using account data associated with the facility, first zone, user account, button, client device 106, and/or reordering application 108, for example.

Figure 5E:
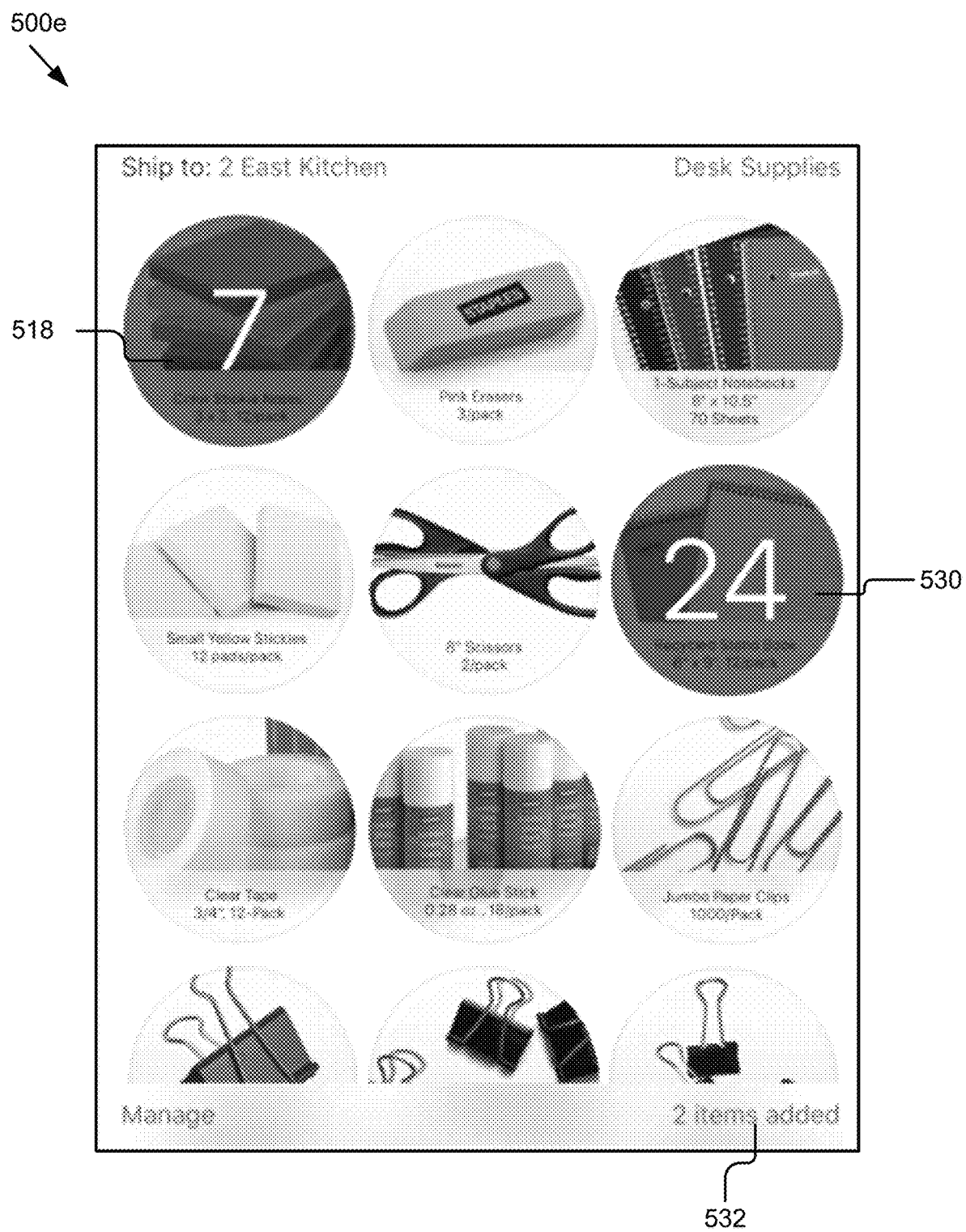
Figure 5F:
Figure 5G:
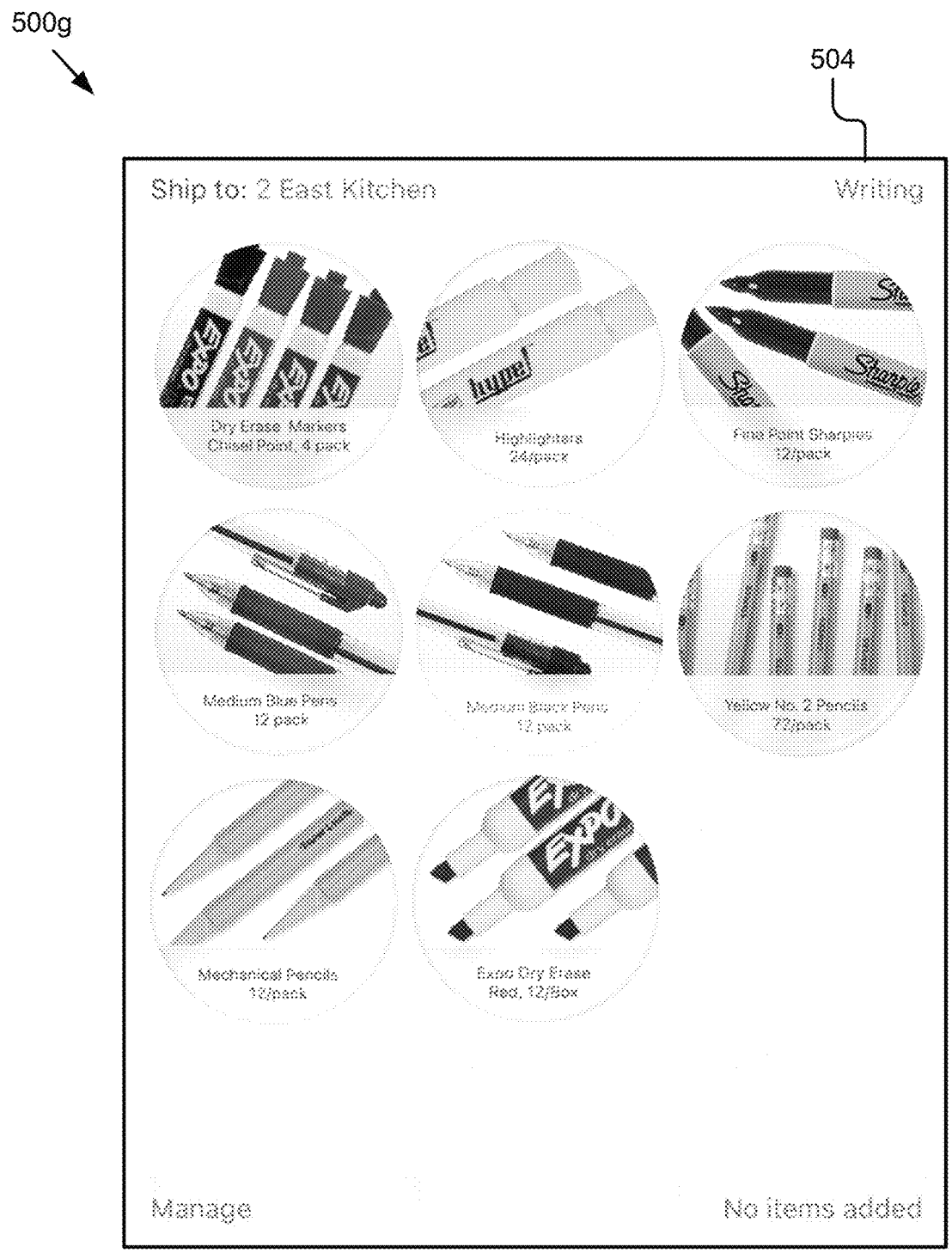
Figure 5H:
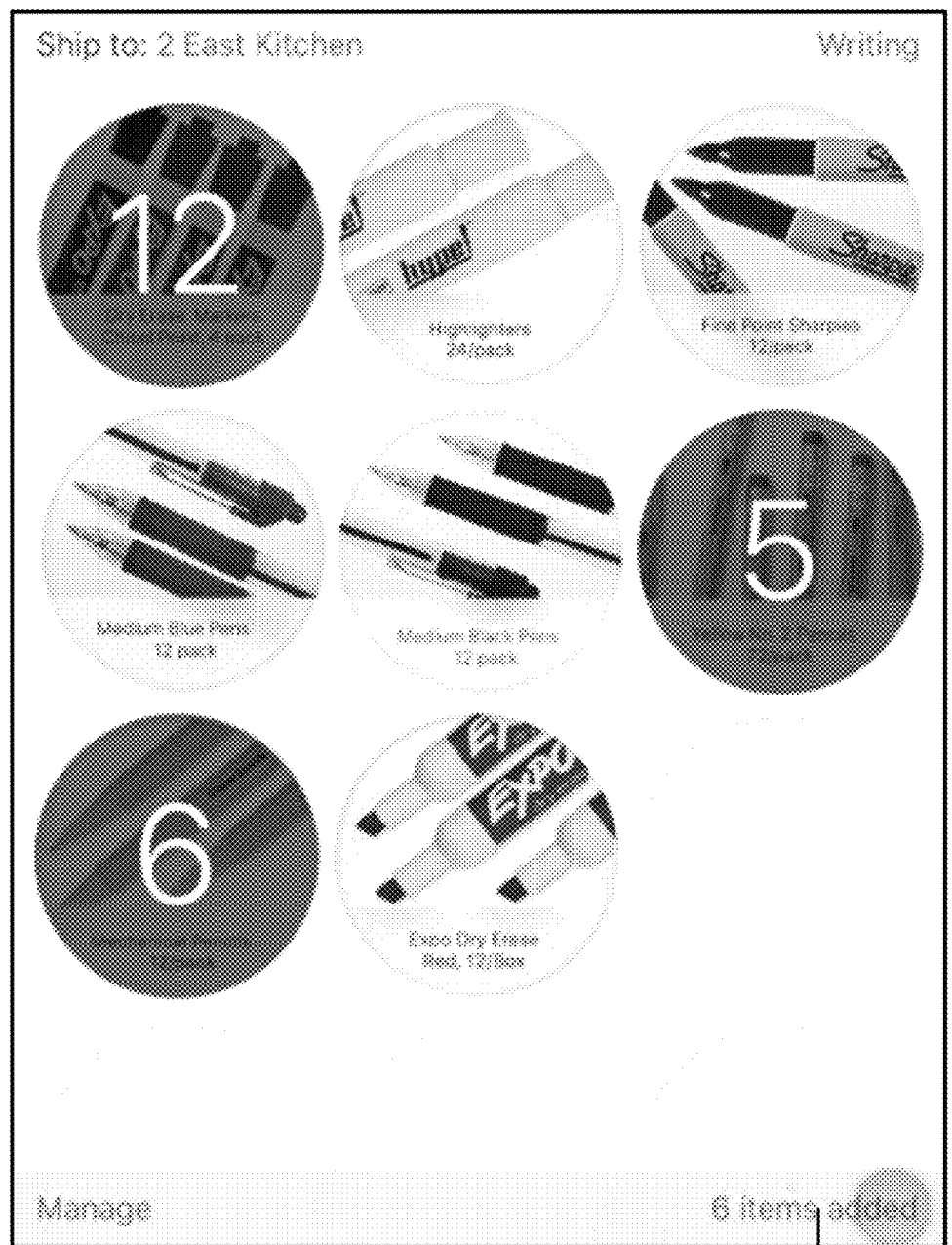
Figure 5I:
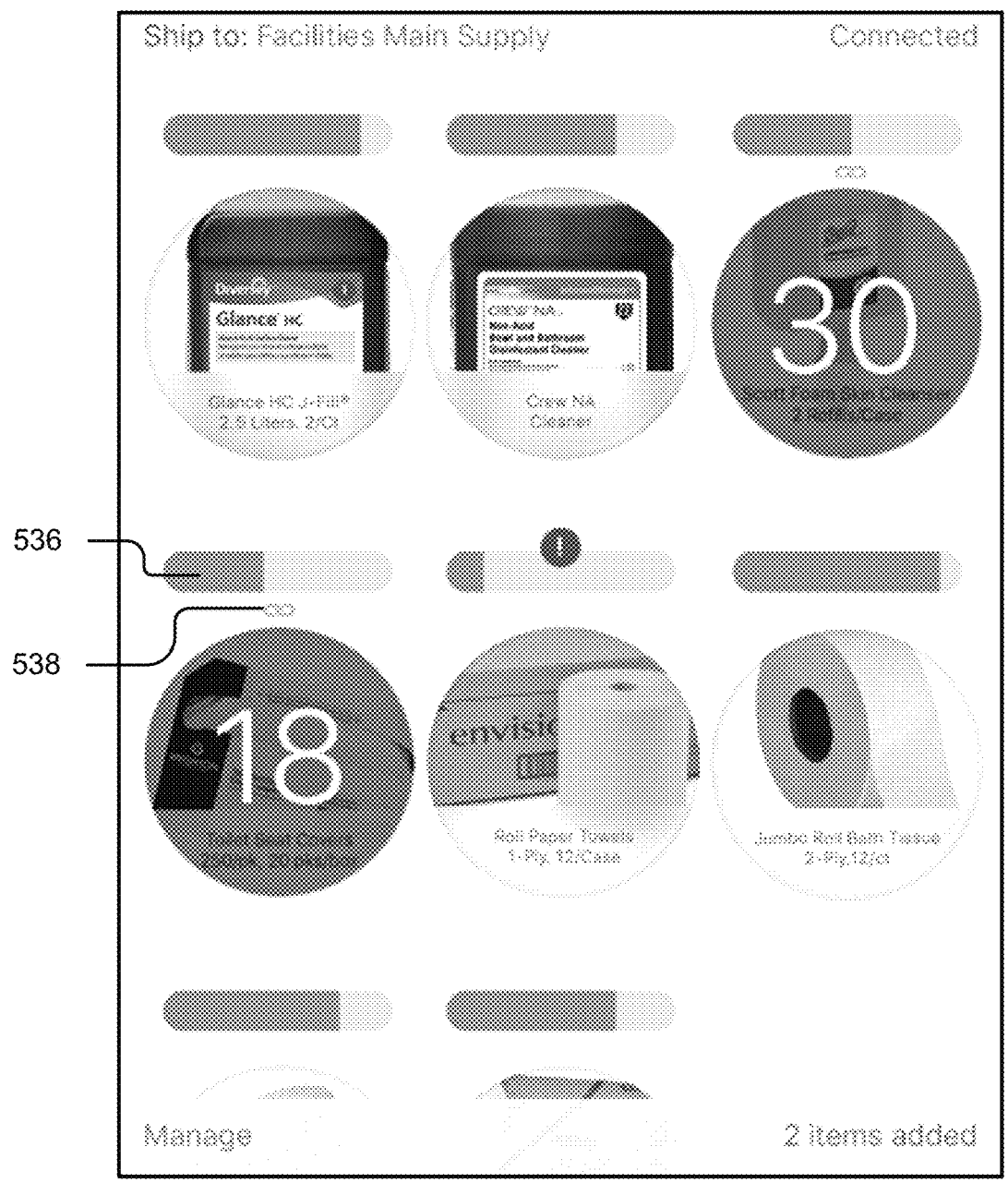
Figure 5J:
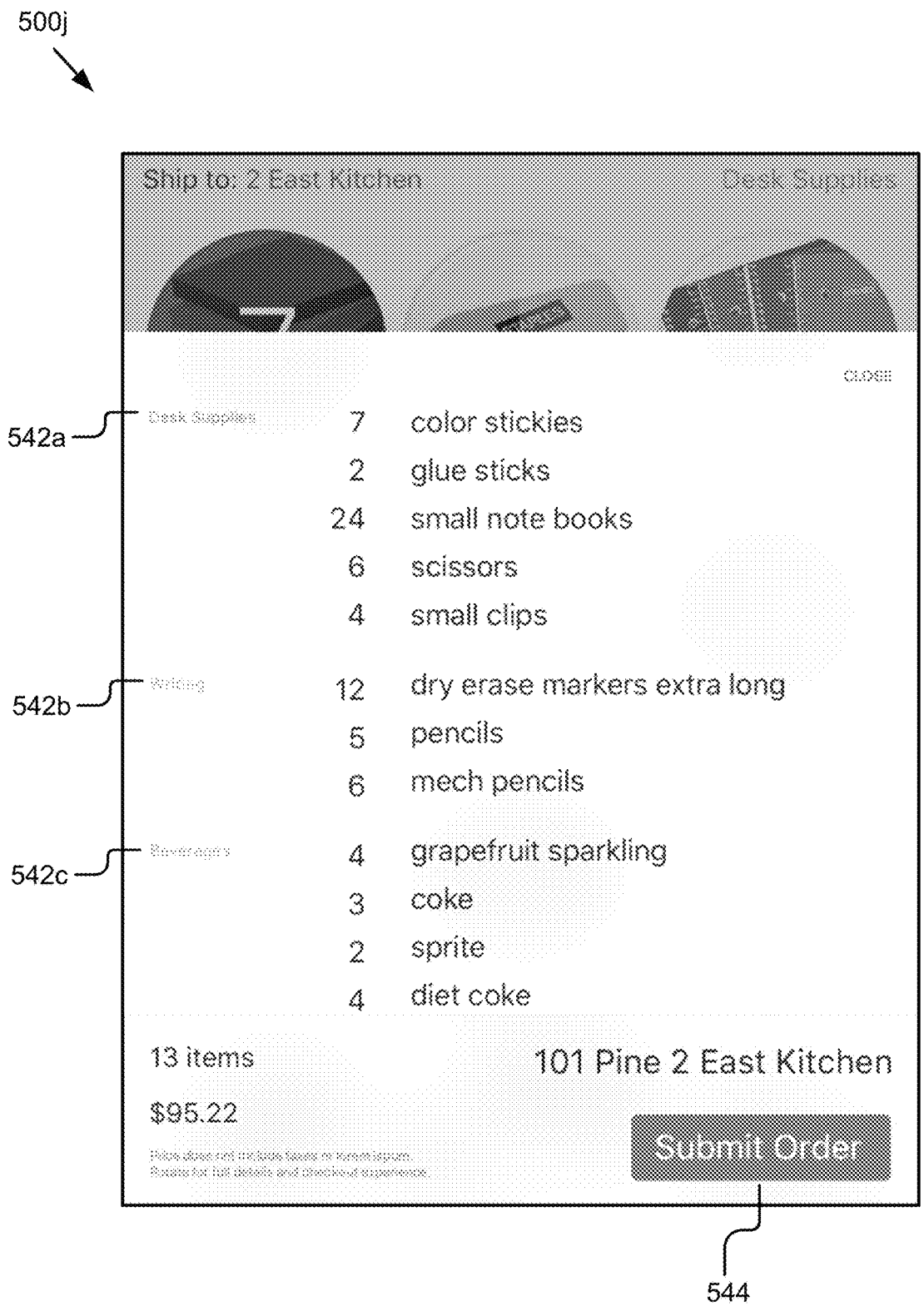

For example, the input may direct the reordering application 108 to order the items (e.g., as illustrated in FIG. 5J). The enterprise application 126 may use the order data to purchase and ship the item(s) in the order to the facility. In some implementations, each item in the order may be associated with the zone and/or category used to order it, so that the items may be delivered to the correct zone and, in some instances, to provide order history data (e.g., for recommending quantities and providing analytics data).

At 234, the reordering application 108 may modify the first set of graphical elements in the graphical user interface based on defined operation and/or the input received at 230. For instance, the enterprise application 126 may transmit an instruction to the reordering application 108 to update the graphical elements representing the set of items to indicate which of the items have been ordered, shipped, delivered, are on back order, etc. In some implementations, the reordering application 108 may modify the graphical element representing the particular item to indicate an order status of the particular item, for example, by overlaying a graphical representation of the order status over the graphical element representing the particular item. An example of updating the graphical elements is described and illustrated in reference to FIG. 5M.

Figure 3:
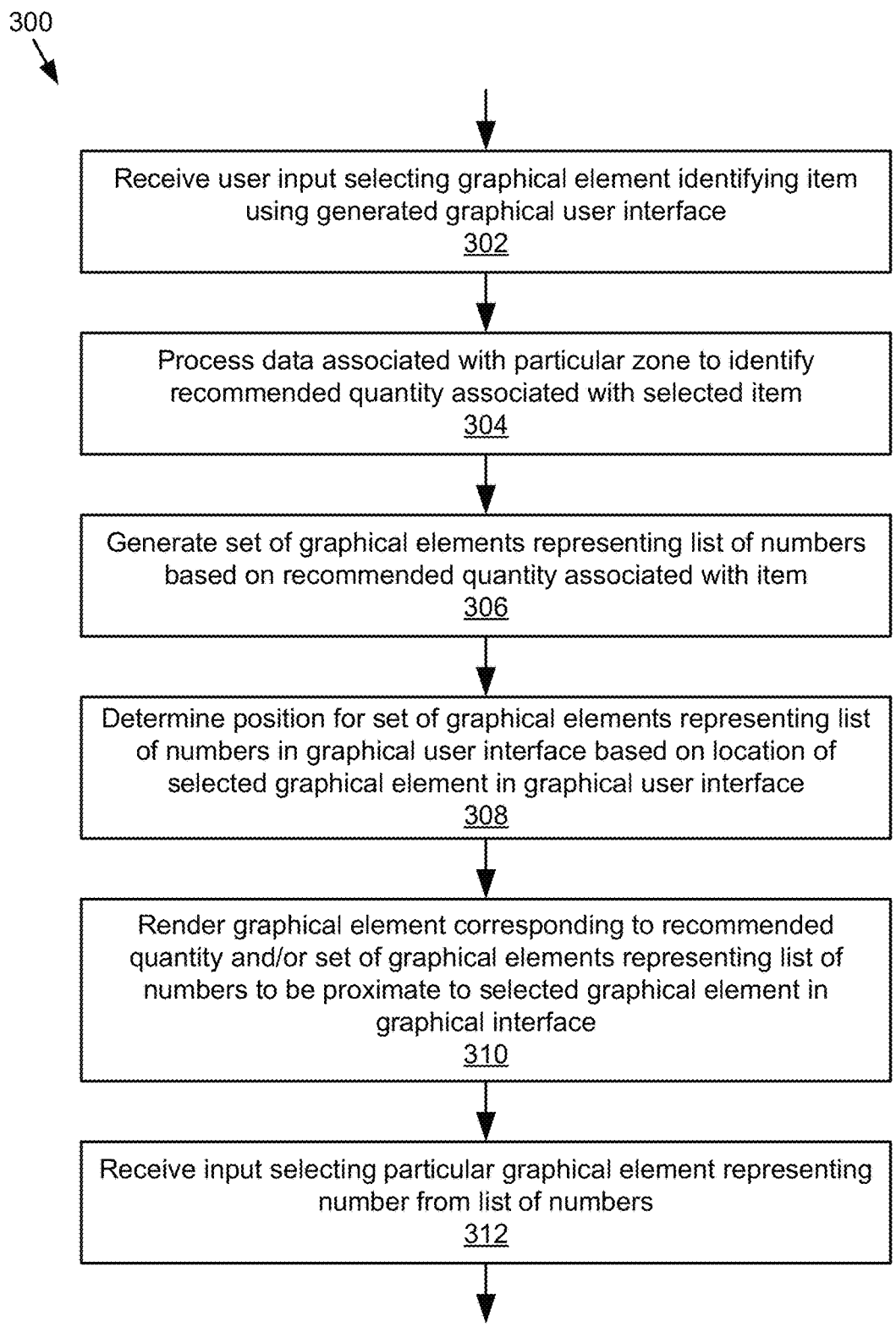
FIG. 3 is a flowchart of an example method for generating a graphical list of quantities and rendering the graphical list of quantities.

FIG. 3 is a flowchart of an example method 300 for generating a graphical list of quantities and rendering the graphical list of quantities at an efficient location in a graphical user interface.

At 302, the reordering application 108 may receive a user input selecting a graphical element representing an item using a generated graphical user interface, for example, as described in reference to 210 in FIG. 2A and in reference to FIG. 5A.

At 304, the reordering application 108 (and/or enterprise application 126) may process data associated with a particular zone, category, and/or item to identify a recommended quantity associated with the selected item. For instance, the reordering application 108 may determine the recommended quantity of the particular item based on a history associated with the particular item and an account associated with the computing device, zone, category, etc. In some implementations, the reordering application 108 may determine an average quantity of the item that is ordered, for example, for the particular zone. In some implementations, the recommended quantity may be adjusted up or down based on various factors. For instance, the recommended quantity may be adjusted based on a length of time since a previous order (e.g., a longer time may indicate a decrease consumption of the item or it may indicate a decreased stock of the item at the zone), a seasonal fluctuation of consumption of the item (e.g., based on orders of the item over the previous year or more at the zone, by the customer, or across customers), or other factors.

In some implementations, the reordering application 108 and/or enterprise application 126 may determine a current inventory level of a consumable item using a refill sensor 116, as described above. In some instances, the reordering application 108 may track usage over time and use the current inventory level and/or usage history to determine the recommended quantity.

In some implementations, at 306, the reordering application 108 may generate a set of graphical elements representing a list of quantities/numbers, for example, based on the recommended quantity associated with item. For example, a range of numbers may be determined to include the recommended quantity.

At 308, the reordering application 108 may determine a position for the set of graphical elements representing the list of numbers in the graphical user interface based on a location of the selected graphical element in the graphical user interface. For example, the graphical list of elements may be rendered to the right of the graphical user interface, as illustrated in the example of FIG. 5B, and the graphical element representing the selected item may remain at the location at which it was selected (e.g., while the remainder of the interface may be grayed out or overlaid with the list of numbers). In some instances, if the graphical element representing the selected item is at the position on the interface where the graphical list of numbers may otherwise be rendered, the reordering application 108 may move the position of the list, for example, as illustrated in the example of FIG. 5D.

At 310, the reordering application 108 may render the graphical element corresponding to recommended quantity and/or the set of graphical elements representing the list of numbers to be proximate to selected graphical element in the graphical user interface. In some implementations, the list of quantities may be automatically scrolled so that the recommended quantity is proximate to the graphical element representing the selected item. If the recommended quantity is not a whole number, a list of whole numbers may be automatically scrolled, so that the recommended quantity is proximate to the graphical representation of the item, even if only whole numbers are rendered and selectable.

In some instances, the graphical list of quantities may be rendered in numerical order. For example, the recommended quantity may be rendered closer to the graphical element representing the particular item in the graphical user interface than other quantities in the graphical list of quantities. Example illustrations of graphical lists rendered at efficient locations are depicted in FIGS. 5B and 5D.

In some implementations, at 312, the reordering application 108 may receive an input selecting a particular graphical element representing a quantity/number from list of numbers, for example, as described in reference to 214 in reference to FIG. 2B.

Figure 4:
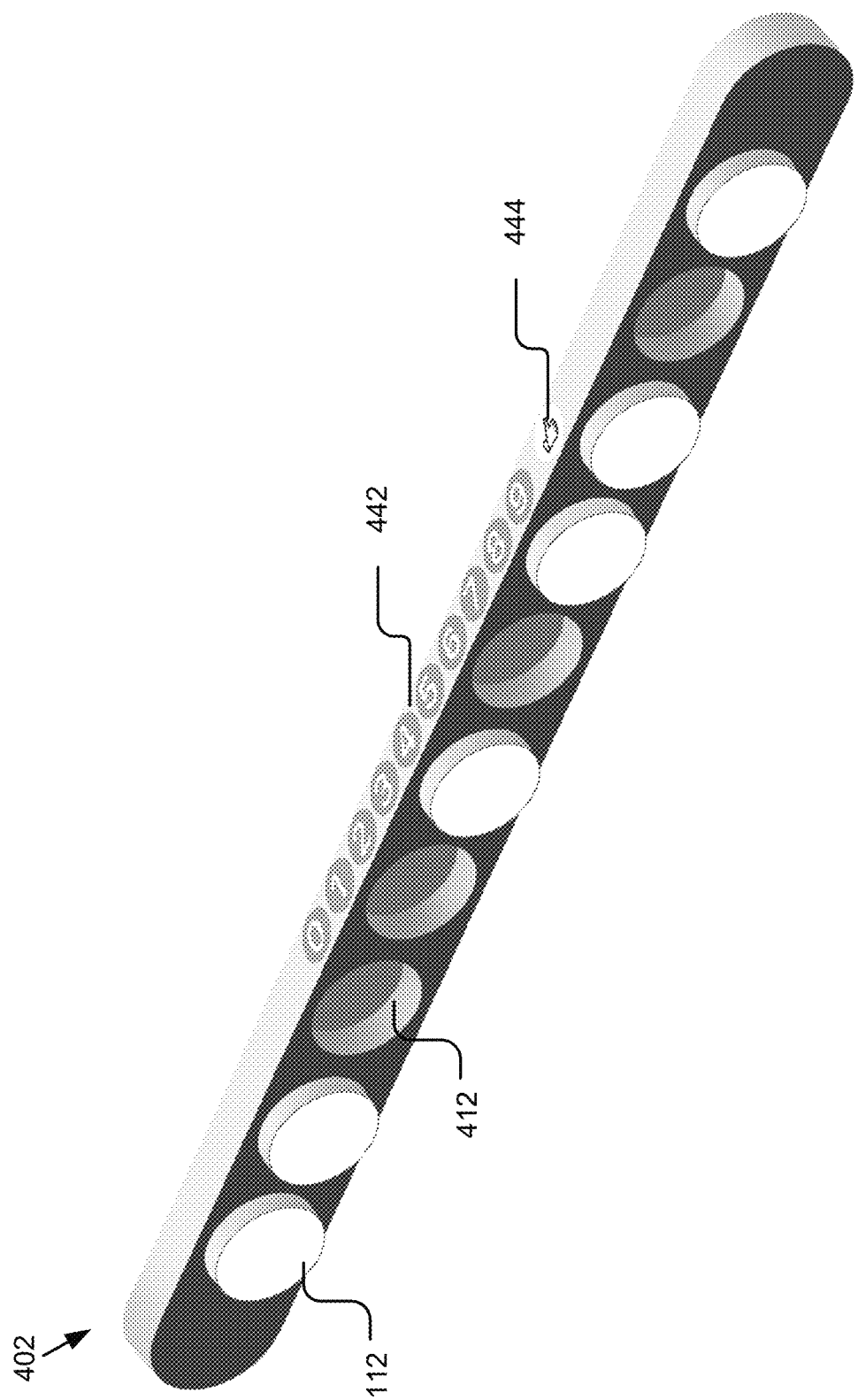
FIG. 4 illustrates an example beacon holder and a beacon.

FIG. 4 illustrates an example implementation of a beacon holder 402. The beacon holder 402 may be mounted to a shelf so that a beacon 112 (e.g., including a button) held by the beacon holder 402 is adjacent to a storage location of an item to which the beacon 112 may be associated.

In some implementations, as illustrated, a beacon holder 402 may include an elongated or long narrow body shaped to fit on the front of shelves. The beacon holder 402 may include beacon receptacles/mounts 412 positioned longitudinally along the length of the body and adapted to receive and retain beacons 112. In some implementations, the beacon holder 402 may be fitted with magnets, hooks, or other hanging mechanisms to attach the beacon holder 402 to a shelf, wall, or door, etc. It should be understood that although round beacons 112 and an elongated beacon holder 402 are depicted, other sizes, shapes, and configurations of beacons 112 and beacon holders 402 are possible and contemplated without departing from the techniques described herein.

In some implementations, the beacon holder 402 may include and/or may be wired to a battery or other power source. The beacon holder 402 may include a power module for powering and/or charging the beacons 112. The beacon holder 402 may include processing capability, a communication unit, and/or mounts 412 for interchangeably receiving, retaining, and, in some implementations, communicating with beacons 112. For example, the beacon 112 and mount 412 may include contacts for conveying power and/or data between a beacon holder 402 and beacon 112. For example, the power module may include charging components, such as a transformer, power regulator, and/or other electrical components transforming the input power source to an appropriate output power for recharging the battery (ies) of the beacons 112. This is advantageous as it can extend the battery life of the beacons 112 as they may be mounted in and held by the beacon holder 402. Other variations are also possible, such as but not limited one where the beacons 112 may not include their own batteries but may effectively be plugged into the hanger's power source when mounted on the beacon holder 402.

In some implementations, the beacon 112 may include a processor and a non-transitory memory storing instructions that are executable by the processor to transmit the ID and/or other information to devices within the beacon's 112 transmission field, such as the client device 106. In some implementations, the beacon 112 may transmit the beacon ID using Bluetooth or other near-field communication protocols.

In some implementations, the beacon holder 402 may include a wireless communication unit (e.g., a Bluetooth radio or other communication unit) for connecting to the client device 106 in order to reduce complexity of individual beacons 112 (e.g., by removing a wireless radio from the beacon 112 that may otherwise be used to communicate with the client device 106). For instance, the beacons 112 may identify themselves to the beacon holder 402 and the beacon holder 402 may then relay the signals received from the beacons 112 to the client device 106.

In some implementations, the beacons 112 used with a smart beacon holder 402 may include a corresponding antenna, coil, and/or computer chip configured to communicate with the smart beacon holder 402 without the beacon 112 necessarily having to contain processing or communication capabilities strong enough to communicate wirelessly with a client device 106 or with an application server 122.

In some implementations, the beacon holder 402 may include a keypad mechanism 442, and/or other components, such as a microphone, speaker, communication unit, etc. For example, as illustrated, the beacon holder 402 may include a keypad mechanism 442 (e.g., a number pad) integrated with the beacon holder 402 across a top surface of a body of the beacon holder 402, although other configurations are possible and contemplated herein. In some implementations, the keypad 442 may serve as an activation mechanism. For example, a particular beacon/key or sequence of numbers/keys may be pressed on the keypad 442 to activate the beacon holder 402 or beacons 112 coupled with the beacon holder 402.

Figure 5K:
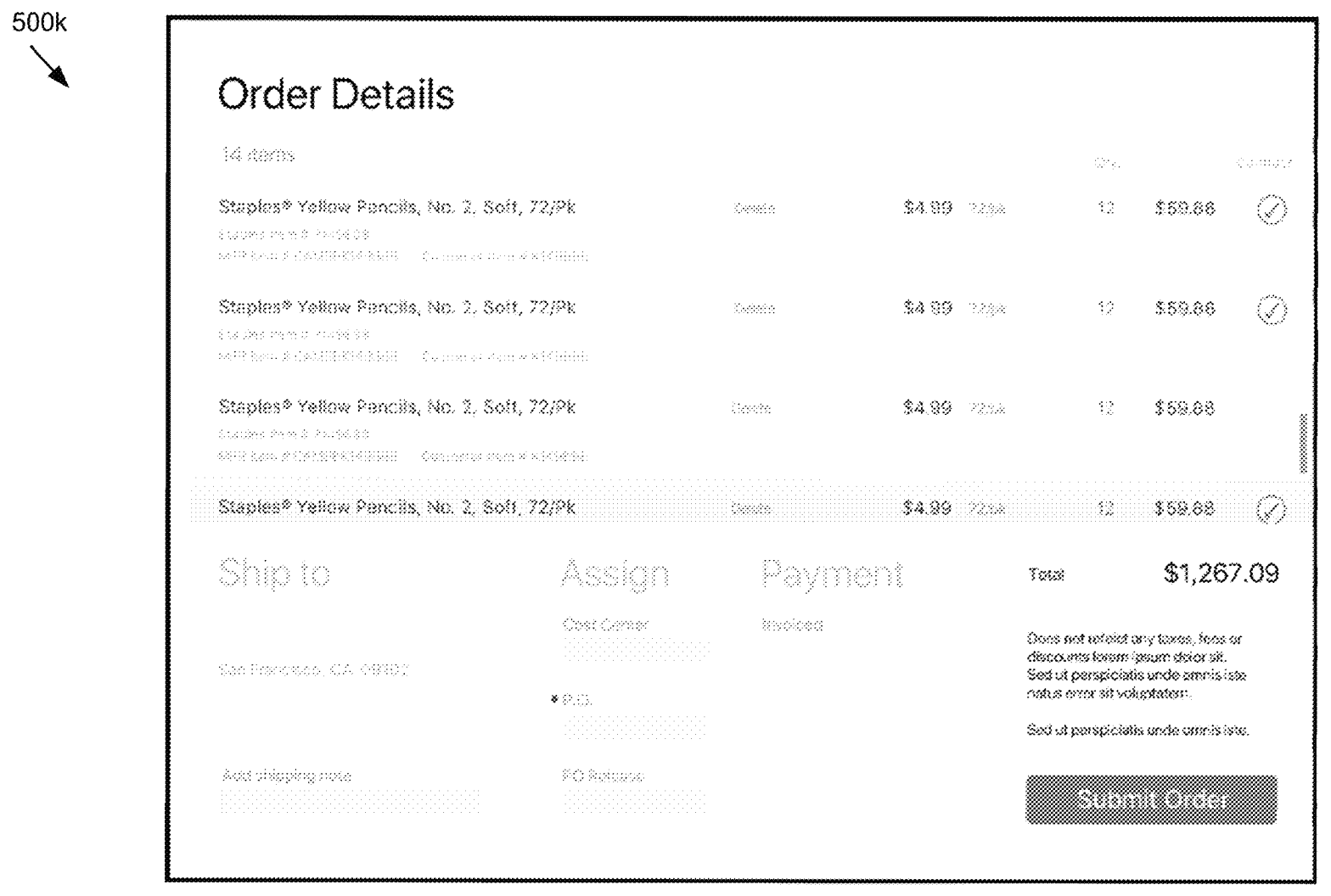
Figure 5L:
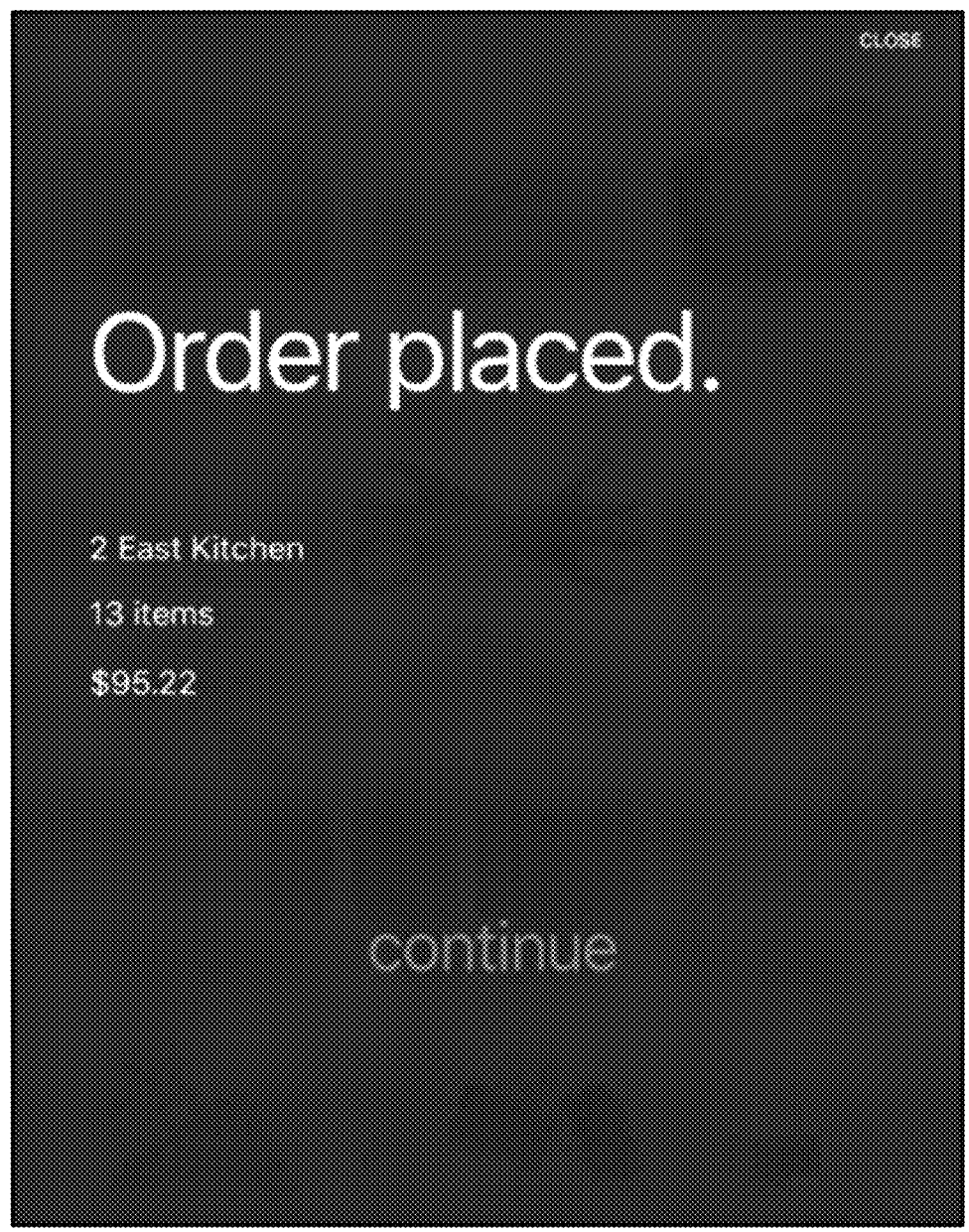
Figure 5M:
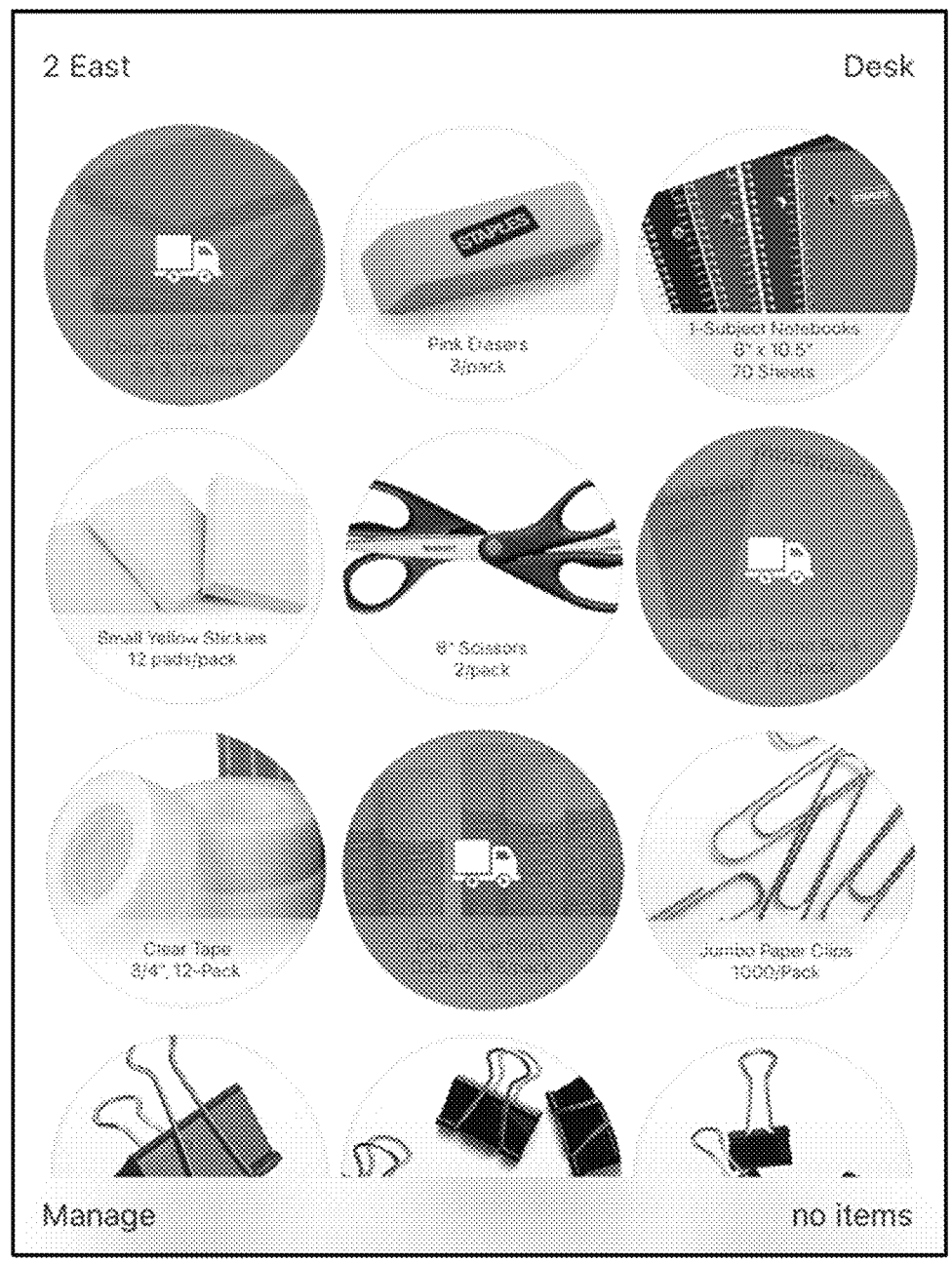
Figure 5N:
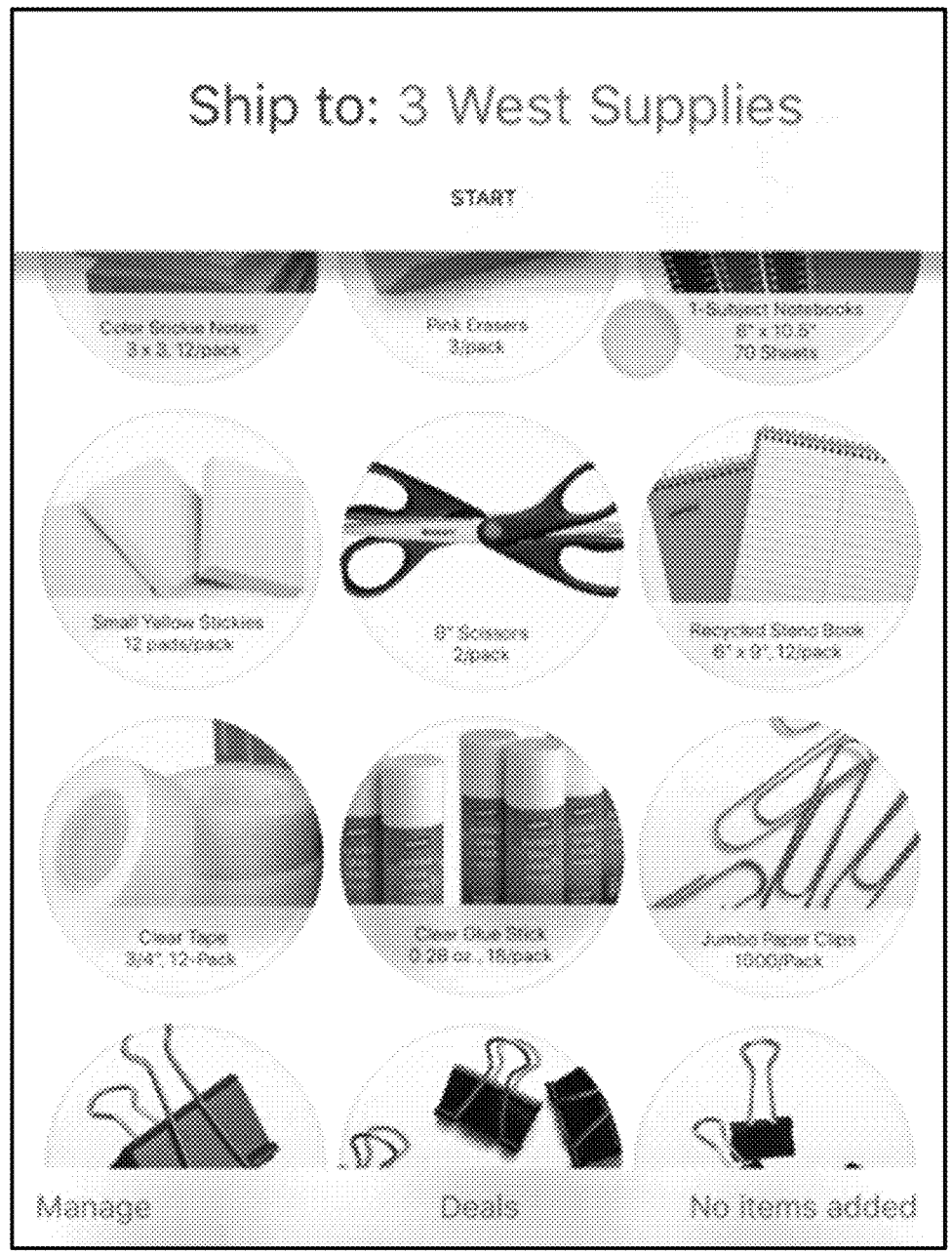
Figure 5O:
Figure 5P:
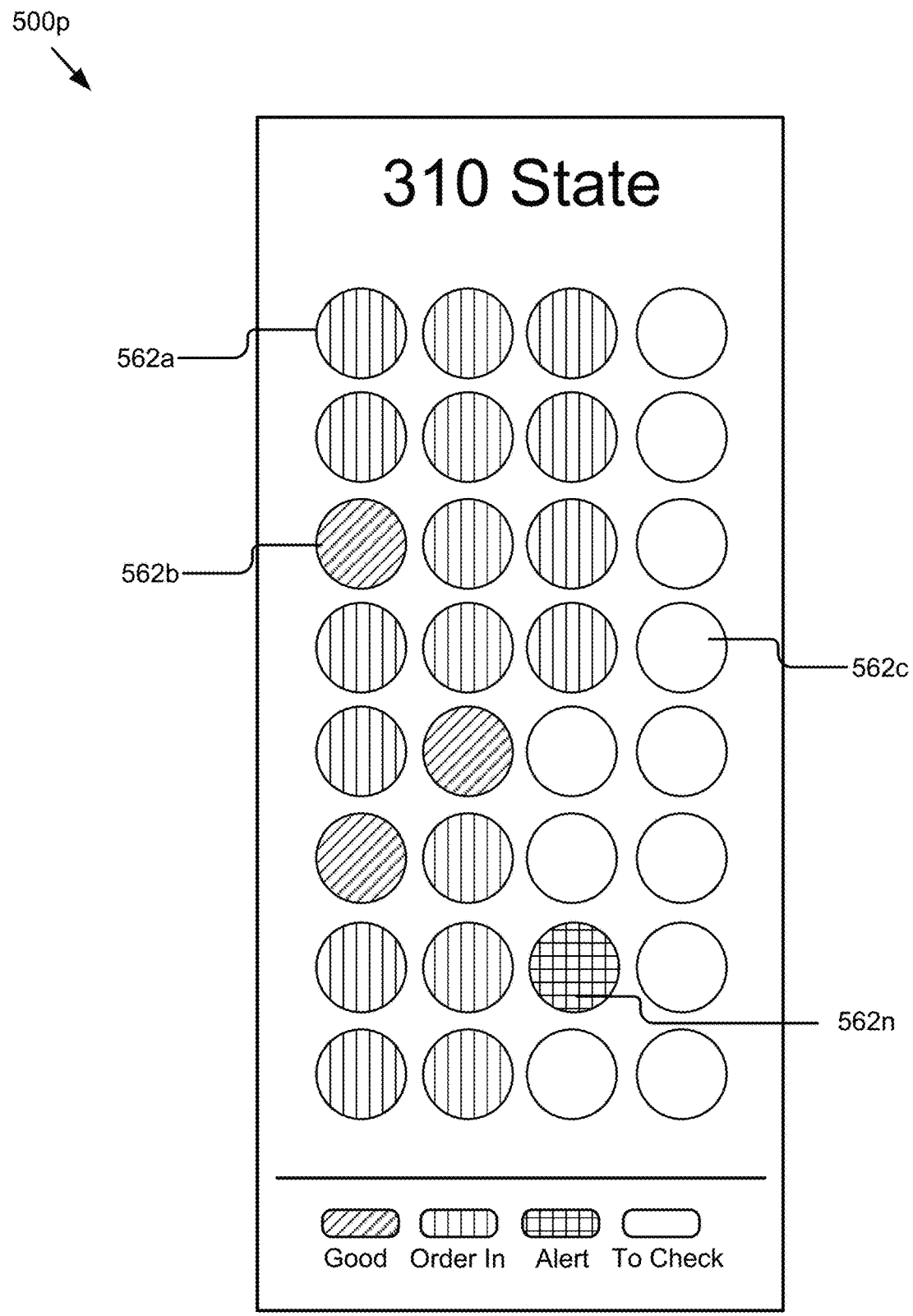
Figure 5Q:
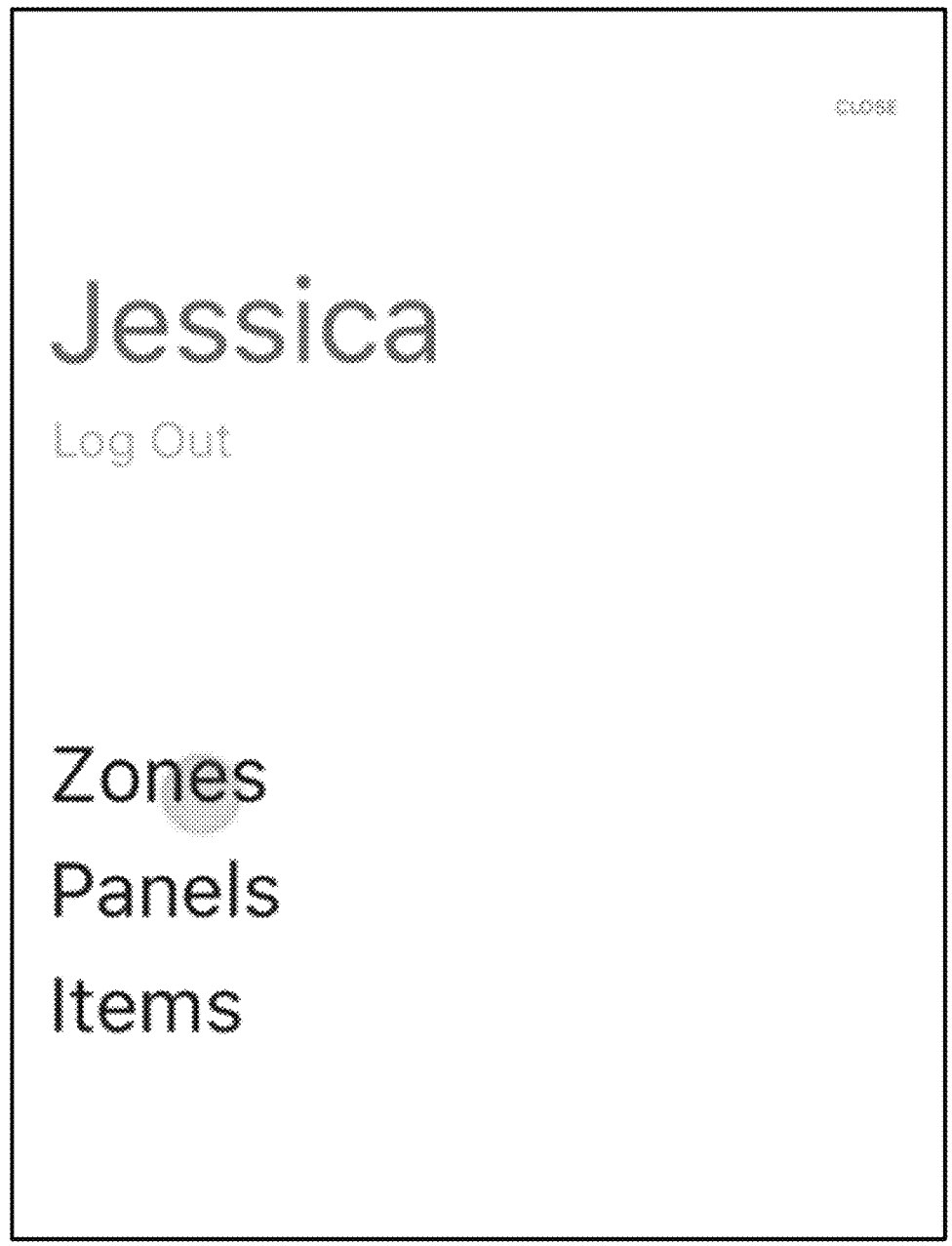
Figure 5S:
Figure 5S:
Figure 5T:
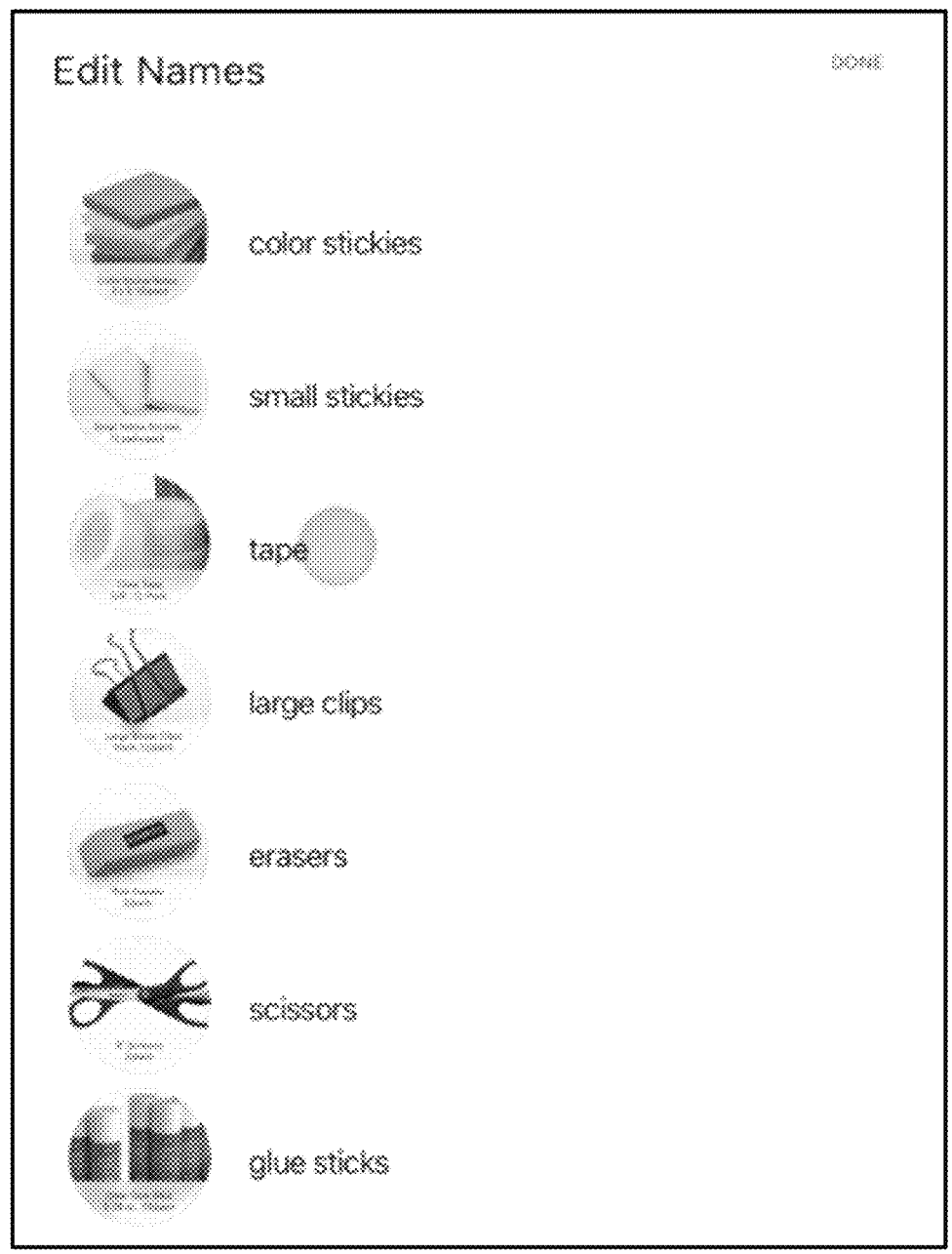

FIGS. 5A-5T illustrate a user experience or set of graphical user interfaces 500a . . . 500t (referred to as UX 500 or interfaces 500) that may be displayed, for example, by the reordering application 108 on the client device 106. The interfaces 500 may receive inputs and provide outputs to the reordering application 108 to allow a user to rapidly order or re-order items. In some implementations, the reordering application 108 may use the interfaces 500 to automatically place multiple orders or otherwise track items across multiple stock rooms and, in some instances, areas within each stock room (e.g., zones). For instance, a facility may have several stock rooms, which may each have various shelves, areas, and/or categories. It can be difficult to track which items are ordered for each of these rooms or areas, for example, when a particular item is ordered for multiple rooms. Accordingly, some implementations of the reordering application 108 may keep track of each item ordered and its ship/deliver-to location, for example, for when a facility has a plurality of stock rooms to which an item may be delivered using the interfaces 500. Additionally, the reordering application 108 may keep track of which items have been previously ordered for each room and/or area to allow items in each of those rooms/areas to be more quickly ordered and tracked.

FIG. 5A illustrates an example interface 500a, in which the reordering application 108 may render virtual buttons on the interface 500a. The virtual buttons may include images and/or descriptions of items. The virtual buttons may be automatically determined based on an order history for a particular user, company, stock room, or area of a stock room, such as a particular zone, as described above. For instance, the interface 500a may be customized to a stock room or area of the stock room. In the illustrated example of FIG. 5A, the interface 500a includes a graphical element 502 indicating a particular zone for which the order is being made. In some instances, the interface 500a may also include an element 504 indicating a category of items that may be stocked in that zone. In some implementations, the interface 500a may display the virtual buttons 506 corresponding to items that may be ordered for that room/area, for example, the virtual buttons may correspond to items previously ordered for that room and/or area, as described above.

FIG. 5B illustrates an example interface 500b, which the reordering application 108 may render upon a selection of a virtual button 506. In the example interface 500b, the selected virtual button 506 is displayed, while all other virtual buttons are grayed out or have a quantity selection element 508 overlaid over them. For instance, the quantity selection element 508 may include a scrollable list of quantities or numbers. In some implementations, the reordering application 108 and/or enterprise application 126 may determine the most frequently ordered quantity of that item by that user, company, stock room, zone, or category of the zone. For instance, for the "2 East Kitchen" zone and "Desk Supplies" category/area, the "Color Stickie Notes" may be most frequently ordered in quantities, on average, of 6-7 items or packages per order. Accordingly, the interface 500b may display the number corresponding to the recommended quantity 510 adjacent to the selected virtual button 506. For example, in cases where the quantity selection element 508 includes a scrollable list of numbers, the list may automatically be scrolled so that the recommended quantity 510 is next to the selected virtual button 506. In some implementations, the recommended quantity 510 may also be rendered in a different color, font, or size than the rest of the list of numbers.

In some implementations, the reordering application 108 may also render additional details 512 regarding the selected item in the graphical interface 500b. For instance, the reordering application 108 may determine details, such as an expected delivery date for the item at the selected and/or recommended quantity. In some implementations, the reordering application 108 may include selectable options that allow a user to send a reminder about the specific item to herself or a stakeholder, comment on the item and/or the order of the item, and remove the item from the order. For instance, the reordering application 108 may allow a user to enter a comment and may transmit the comment to computing device of a salesperson, administrator, facilities manager, account representative, etc., (e.g., via SMS text message, push notification, e-mail, etc.) identifying the item, zone, category, and/or user account.

In some implementations, the reordering application 108 may determine a quantity trend based on an order history of the item, a seasonal trend of the item, or another factor. For instance, the reordering application 108 may compute the quantity trend based on whether the usage (e.g., based on a refill sensor 116, an order quantity and frequency, etc.) or order quantity of the item is changing over time or is predicted to change (e.g., based on a seasonal trend, etc.). The reordering application 108 may render a graph 514 based on the quantity trend, which may be displayed along with the graphical list 508.

In some implementations, the reordering application 108 may determine whether the item is in stock or out of stock in the selected and/or recommended quantity. In some instances, where the item is out of stock, the reordering application 108 (e.g., in association with the enterprise application 126) may identify an estimated ship date and/or an alternative item that may replace the selected item (e.g., based on matching attributes between the two items).

FIG. 5C illustrates an example interface 500c, which may correspond to the interface 500a, and a selected quantity of the selected item (e.g., color stickie notes) may be overlaid over the corresponding virtual button, as shown at 518. This updated graphical element 518 helps users remember which items they have selected (e.g., to be ordered) while avoiding consuming display area by displaying an order quantity somewhere else on the interface 500c. The user may select the previously selected virtual button 518 to adjust the quantity, or may select another virtual button 520 to add a quantity of another item to the order.

FIG. 5D illustrates an example interface 500d, which the reordering application 108 may be display upon receiving an input selecting a virtual button 520. As illustrated, the quantity selection element 528 (e.g., corresponding to quantity selection element 508) may be adjusted specifically to the selected item. In some implementations, the quantity selection element 528 may be moved within the interface 500d to be adjacent to the selected virtual button 520. For instance, if a selected button is located to the right, the quantity selection element (e.g., a scrollable list) may be moved within the interface 500d (e.g., to the middle or left) so that both the list and the specific recommended quantity/number (e.g., the most frequently ordered or selected quantity) are adjacent to the displayed selected virtual button 520. Similarly, the reordering application 108 may also render the additional details 522 (corresponding to 512) and/or a quantity trend graph 524 (corresponding to 514) for the selected item. These elements 522 and 524 may also be moved in the graphical interface 500d to avoid interference with the quantity selection element 528 and selected graphical element/virtual button 520. For instance, these elements 522 and 524 may be located above and/or below the graphical element 520 based on an amount of available space in the graphical user interface 500d above and/or below the graphical element 520.

In instances where the selected virtual button is located near the middle or another area of the interface, the quantity selection element 528 may be rendered to the left or to the right of the selected virtual button 520 or the virtual button 520 may move within the interface to provide room for the quantity selection element 528. It should be noted that although the quantity selection element 528 is illustrated as a vertically scrollable list, it may be a horizontally scrollable list, cloud of selectable elements, or may take other forms without departing from the scope of this disclosure.

FIG. 5E illustrates an example interface 500e, which may correspond to the interface 500a with each of the virtual buttons 518 (corresponding to 508) and 530 (corresponding to 520) having an overlay indicating a selected quantity of the corresponding items. In some implementations, the interface 500e may include a graphical element 532 indicating how many items (or total quantity of items) have been selected in the room, category/area, or total.

FIG. 5F illustrates an example interface 500f illustrating a transition from an interface for a first category in a particular zone (e.g., interface 500e in FIG. 5E) to an interface for a second category in the particular zone (e.g., interface 500g in FIG. 5G). The reordering application 108 may initiate the transition based on a selection of the graphical element 504 (e.g., illustrated in FIG. 5A), a swipe gesture across a touch screen display of the client device 106, or receipt of a beacon ID, as described above.

FIG. 5G illustrates an example interface 500g, which is similar to the interface 500a, but corresponds to a different category within the same store room or zone, for example, as indicated in at the graphical element 504. The interface 500a or 500e may transition to this category/area in response to receiving a user input selecting the element 504 or swiping to the side within the interface.

The reordering application 108 may allow items and quantities may be selected for the second category from the interface 500f and quantity overlays may be displayed in the same way as is described above, as illustrated in interface 500h in FIG. 5H.

FIG. 5I illustrates an example interface 500i including graphical representations of inventory levels 536 (e.g., associated with and positioned adjacent to virtual buttons) that may be generated by the reordering application 108. The reordering application 108 may compute values and generate graphical representations of inventory levels 536 based on the refill sensors 116, for example, as described above. The interface 500i may include one or more thresholds 538 that may be set, for example, by selecting the inventory levels 538, so that when a value (e.g., represented by a bar) of the inventory level 538 matches the threshold 538, the reordering application 108 may perform a defined operation. For instance, the defined operation may be automatically ordering the item at the recommended or defined quantity or transmitting a notification to a user with the inventory level of the item.

In some implementations, in response to receiving a selection of the graphical element 532 (e.g., as indicated in FIGS. 5E and 5H), the reordering application 108 may display an interface 500j, as illustrated in FIG. 5J. The interface 500j may summarize the items selected, for example, for the particular zone (e.g., for the 2 East Kitchen) or for the facility. In some implementations, the items selected may be grouped by category/area, as indicated at 542a, 542b, and 542c, for example, based on the category/area interfaces from which they were selected. In some implementations, a user may be able to click/select an element 542 to return to the interface corresponding to that area, for example, selecting the element 542b for writing materials may cause the interface 500g to be displayed.

In some implementations, the displayed items may be described in natural language or summaries of the items (e.g., instead of "Brand×100 page 4×8 note books," "small note books" may be displayed). In some implementations, the natural language may be set by an administrator, a natural language processing algorithm, by the user according to their preferences, or using other programmed logic to reduce item titles or descriptions to simple terms. In some implementations, the interface 500j may include a selectable element 544 for submitting the order.

In some implementations, in response to the client device 106 being rotated to a landscape view, the reordering application 108 may replace the interface 500j with a detailed view of the order and items in the order, as illustrated in the interface 500k in FIG. 5K.

In some implementations, in response to the element 544 being selected, the order may be automatically placed using account details (e.g., payment and/or delivery details) associated with the user, client device, reordering application, company, address, stock room, zone, and/or category. In some implementations, an order summary interface 500l may be displayed to the user, as illustrated in FIG. 5L. In some instances, a user may continue from the interface 500l to an interface 500n, illustrated in FIG. 5N, corresponding to a subsequent zone, where the user may indicate that the user wishes to order items for the next zone (e.g., 3 West Supplies) in a series of stock rooms/zones in a facility.

FIG. 5M illustrates an example interface 500m, which may correspond to the interface 500e, for example, after the order has been placed. In some implementations, the quantity overlays over the selected virtual buttons may be updated by the reordering application 108 to indicate that those items have been ordered or another status. For example, the reordering application 108 may receive confirmation data from the enterprise application 126 indicating that those items have been ordered and, in response, may render overlays or other graphical elements over the virtual buttons corresponding to the ordered items. Similarly, the overlays or graphical elements may indicate when items have been shipped, delivered, canceled, or have some other status.

FIG. 5O illustrates an example interface 500o, which the reordering application 108 may displayed in response to a user selecting the graphical element 502 (e.g., as indicated in FIG. 5A). The interface 500o may provide a list of zones in a facility as well as whether orders have been placed or are in process for each of the zones. The graphical elements corresponding to each zone may be selected to view, edit, or place an order for that stock room. It should be noted that although stock rooms are displayed as zones, as well as discussed herein, the techniques described herein may include areas of a stock room, janitorial closet, facility, or any other division for which items and orders may be tracked.

FIG. 5P illustrates an example interface 500p, which the reordering application 108 may display to allow management and reordering across instances of the reordering application 108 for a facility, company, or client. In some implementations, the interface 500p includes graphical elements 562a . . . 562n arranged to represent the zones in a facility. For example, as illustrated, the graphical elements 562 may represent a facility with 4 zones on each of 8 floors of the facility. In some implementations, a particular graphical element 562 may be selectable to view the set of items and/or order details for the zone corresponding to the particular graphical element 562.

The interface 500p may display information, such as order or inventory status, for the zones in the facility. In some implementations, the reordering application 108 (e.g., in conjunction with the enterprise application 126) may aggregate the information for the statuses submitted by multiple instances of the reordering application 108. For instance, an administrator may use the interface 500p to view status information in each zone entered by various instances of the reordering application 108. The graphical elements 562a, 562b, 562c, and 562n may be individually formatted (e.g., with changing shapes, colors, or patterns) to correspond to the statuses of the orders and/or inventory in the corresponding zones. In some implementations, the interface 500p may also display analytic information identifying how many items are ordered, a duration of time used to order the items, when orders were submitted, total cost of orders, etc.

FIG. 5Q illustrates an example interface 500q, which the reordering application 108 may display to allow management of the reordering application 108. For instance, the interface 500q allows a user to select whether to manage zones (e.g., stock rooms), panels (e.g., categories, areas, or shelves within a zone), or individual items, depending on the implementation.

FIG. 5R illustrates an example interface 500r, in which the zones or stock rooms are listed, which may be generated by the reordering application 108 in response to the reordering application 108 receiving a selection to manage the zones. A user can add, remove, name, sort, or edit the zones listed. In some instances, the user may change the order of the listed zones. The listed order of zones may dictate how the interfaces 500 progress for each of the zones as orders for each zone are placed. For instance, after an order is placed for the "2 West Kitchen" zone the interface 500 may automatically render an interface corresponding to the "2 West Supplies" zone, as discussed above.

FIG. 5S illustrates an example interface 500s generated by the reordering application 108 for managing panels, which may correspond to categories, areas within a stock unit, zone, shelving unit, etc. For example, the interface 500s allows a user to add, remove, name, sort, or edit the panels. In some implementations, the user may select one of the panels and define items or orders related to that panel.

FIG. 5T illustrates an example interface 500t, which may allow a user to manage frequently ordered items. In some implementations, the interface 500t may allow a user to add, remove, or edit items which may be included in interfaces 500 across zones, for a particular zone, for a particular panel, or otherwise. In some implementations, the interface 500t may allow a user to provide names or summaries for items.

Figure 6:
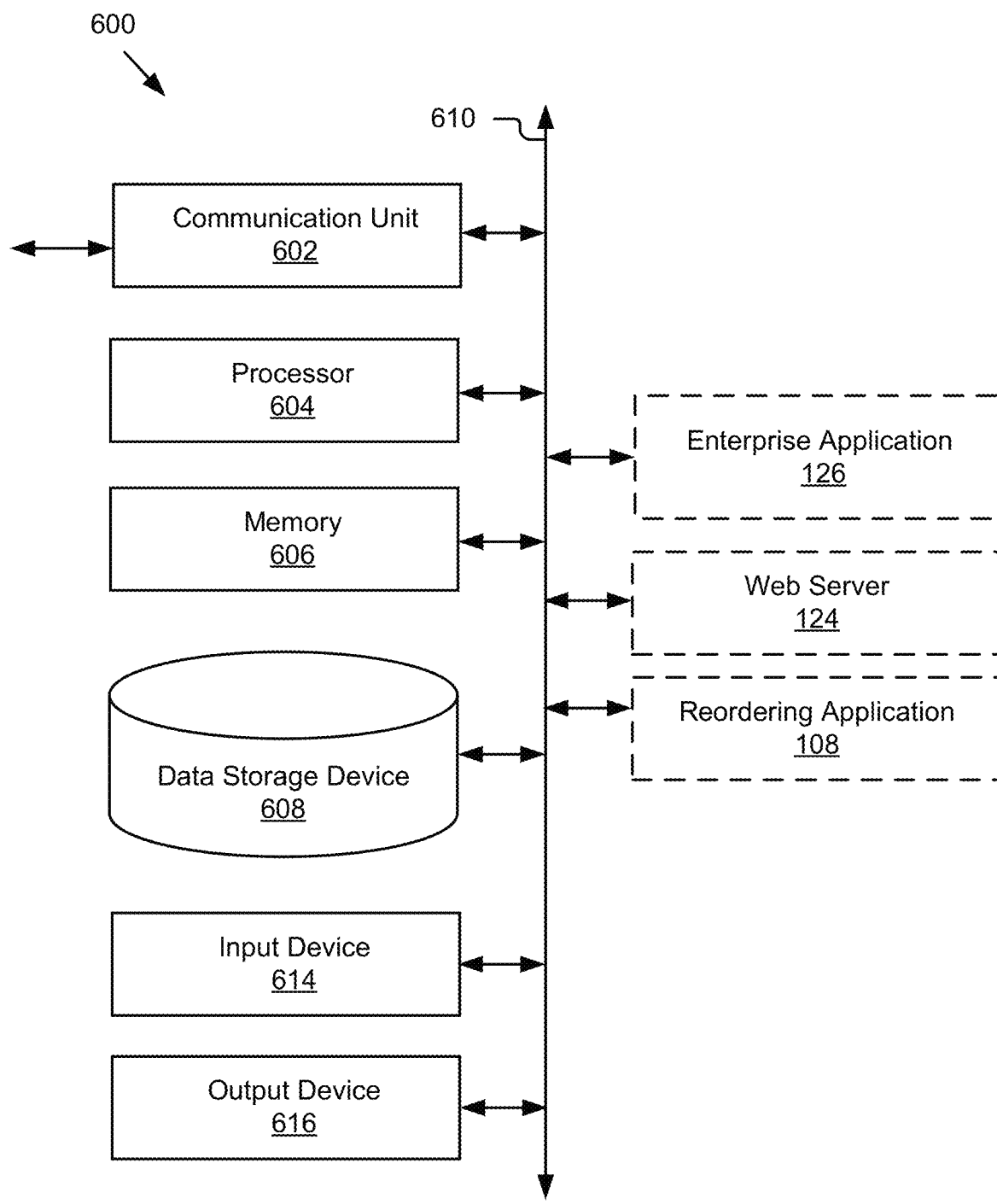
FIG. 6 is a block diagram of an example computing device.

FIG. 6 is a block diagram of an example computing system 600, which may represent the computer architecture of a client device 106, third-party server 118, application server 122, and/or other device described herein, depending on the implementation. In some implementations, as depicted in FIG. 6, the computing system 600 may include an enterprise application 126, a web server 124, a reordering application 108, or another application, depending on the configuration. For instance, a client device 106 may include a reordering application 108 (which could incorporate various aspects of the enterprise application 126, in some implementations); and the application server 122 may include the web server 124, the enterprise application 126, and/or components thereof, although other configurations are also possible and contemplated.

The enterprise application 126 includes computer logic executable by the processor 604 to perform operations discussed elsewhere herein. The enterprise application 126 may be coupled to the data storage device 608 to store, retrieve, and/or manipulate data stored therein and may be coupled to the web server 124, the reordering application 108, and/or other components of the system 100 to exchange information therewith.

The web server 124 includes computer logic executable by the processor 604 to process content requests (e.g., to or from a client device 106). The web server 124 may include an HTTP server, a REST (representational state transfer) service, or other suitable server type. The web server 124 may receive content requests (e.g., product search requests, HTTP requests) from client devices 106, cooperate with the enterprise application 126 to determine the content, retrieve and incorporate data from the data storage device 608, format the content, and provide the content to the client devices 106.

In some instances, the web server 124 may format the content using a web language and provide the content to a corresponding reordering application 108 for processing and/or rendering to the user for display. The web server 124 may be coupled to the data storage device 608 to store retrieve, and/or manipulate data stored therein and may be coupled to the enterprise application 126 to facilitate its operations.

The reordering application 108 includes computer logic executable by the processor 604 on a client device 106 to provide for user interaction, receive user input, present information to the user via a display, and send data to and receive data from the other entities of the system 100 via the network 102. In some implementations, the reordering application 108 may generate and present user interfaces based at least in part on information received from the enterprise application 126 and/or the web server 124 via the network 102. For example, a customer/user 114 may use the reordering application 108 to receive the product pages provided by the application server 122, view various products available online, add products to a virtual cart, purchase products, receive discounts on products, etc. In some implementations, the reordering application 108 includes a web browser and/or code operable therein, a customized client-side application (e.g., a dedicated mobile app), a combination of both, etc. For example, in some implementations, the reordering application 108 may generate and display graphical user interfaces, such as those interfaces illustrated and described in reference to FIG. 5A-5T.

As depicted, the computing system 600 may include a processor 604, a memory 606, a communication unit 602, an output device 616, an input device 614, and a data storage device 608, which may be communicatively coupled by a communication bus 610. The computing system 600 depicted in FIG. 6 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 600 may include various operating systems, sensors, additional processors, and other physical configurations. The processor 604, memory 606, communication unit 602, etc., are representative of one or more of these components.

The processor 604 may execute software instructions by performing various input, logical, and/or mathematical operations. The processor 604 may have various computing architectures to method data signals (e.g., CISC, RISC, etc.). The processor 604 may be physical and/or virtual, and may include a single core or plurality of processing units and/or cores. In some implementations, the processor 604 may be coupled to the memory 606 via the bus 610 to access data and instructions therefrom and store data therein. The bus 610 may couple the processor 604 to the other components of the computing system 600 including, for example, the memory 606, the communication unit 602, the input device 614, the output device 616, and the data storage device 608.

The memory 606 may store and provide access to data to the other components of the computing system 600. The memory 606 may be included in a single computing device or a plurality of computing devices. In some implementations, the memory 606 may store instructions and/or data that may be executed by the processor 604. For example, the memory 606 may store one or more of the enterprise application 126, the web server 124, the reordering application 108, and their respective components, depending on the configuration. The memory 606 is also capable of storing other instructions and data, including, for example, an operating system, hardware drivers, other software applications, databases, etc. The memory 606 may be coupled to the bus 610 for communication with the processor 604 and the other components of computing system 600.

The memory 606 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 604. In some implementations, the memory 606 may include one or more of volatile memory and non-volatile memory (e.g., RAM, ROM, hard disk, optical disk, etc.). It should be understood that the memory 606 may be a single device or may include multiple types of devices and configurations.

The bus 610 can include a communication bus for transferring data between components of a computing device or between computing devices, a network bus system including the network 102 or portions thereof, a processor mesh, a combination thereof, etc. In some implementations, the enterprise application 126, web server 124, reordering application 108, and various other components operating on the computing system/device 100 (operating systems, device drivers, etc.) may cooperate and communicate via a communication mechanism included in or implemented in association with the bus 610. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 602 may include one or more interface devices (I/F) for wired and wireless connectivity among the components of the system 100. For instance, the communication unit 602 may include, but is not limited to, various types known connectivity and interface options. The communication unit 602 may be coupled to the other components of the computing system 600 via the bus 610. The communication unit 602 can provide other connections to the network 102 and to other entities of the system 100 using various standard communication protocols. In some implementations, the communication unit 602 may include a (or multiple, for example, for communication with a large number of buttons 112 or with multiple sources simultaneously) Wi-Fi, Bluetooth, NFC, RFID, or other radio, and/or may include wired communication units.

The input device 614 may include any device for inputting information into the computing system 600. In some implementations, the input device 614 may include one or more peripheral devices. For example, the input device 614 may include a keyboard, a pointing device, microphone, an image/video capture device (e.g., camera), a touch-screen display integrated with the output device 616, etc. The output device 616 may be any device capable of outputting information from the computing system 600. The output device 616 may include one or more of a display (LCD, OLED, etc.), a printer, a haptic device, audio reproduction device, touch-screen display, a remote computing device, etc. In some implementations, the output device is a display which may display electronic images and data output by a processor of the computing system 600 for presentation to a user, such as the processor 604 or another dedicated processor.

The data storage device 608 may include one or more information sources for storing and providing access to data. In some implementations, the data storage device 608 may store data associated with a database management system (DBMS) operable on the computing system 600. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The data stored by the data storage device 608 may organized and queried using various criteria including any type of data stored by them, such as described herein. For example the data storage device 608 may store the database 128. The data storage device 608 may include data tables, databases, or other organized collections of data. Examples of the types of data stored by the data storage device 608 may include, but are not limited to the data described with respect to the figures, for example.

The data storage device 608 may be included in the computing system 600 or in another computing system and/or storage system distinct from but coupled to or accessible by the computing system 600. The data storage device 608 can include one or more non-transitory computer-readable mediums for storing the data. In some implementations, the data storage device 608 may be incorporated with the memory 606 or may be distinct therefrom.

The components of the computing system 600 may be communicatively coupled by the bus 610 and/or the processor 604 to one another and/or the other components of the computing system 600. In some implementations, the components may include computer logic (e.g., software logic, hardware logic, etc.) executable by the processor 604 to provide their acts and/or functionality. In any of the foregoing implementations, the components may be adapted for cooperation and communication with the processor 604 and the other components of the computing system 600.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description.

For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system 10 and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
generating, by one or more processors, a graphical user interface including a first graphical panel, the first graphical panel including a first plurality of virtual buttons, each of the first plurality of virtual buttons including a graphical representation representing an item of a first set of items, the graphical user interface allowing the first graphical panel to be selected from a plurality of graphical panels, the plurality of graphical panels including the first graphical panel, the first graphical panel being displayed on a client device;
modifying, by the one or more processors, two or more virtual buttons of the first plurality of virtual buttons including overlaying a graphical information indicator over each of the two or more virtual buttons based on a selection of each of the two or more virtual buttons, wherein modifying the two or more virtual buttons includes:
receiving, by the one or more processors, a first input selecting a first virtual button representing a first item from the first-plurality of virtual buttons;
modifying, by the one or more processors, the first virtual button to indicate that the first item has been selected based on the first input including overlaying a first graphical information indicator over the first virtual button, the first graphical information indicator indicating one or more of a quantity and an order status associated with the selection of the first item;
receiving, by the one or more processors, a second input selecting a second virtual button representing a second item from the first plurality of virtual buttons; and
modifying, by the one or more processors, the second virtual button to indicate that the second item has been selected based on the second input including overlaying a second graphical information indicator over the second virtual button, the first virtual button and the second virtual button simultaneously respectively indicating the selection of the first item and the second item;
receiving, by the one or more processors, a third input selecting a second graphical panel of the plurality of graphical panels; and
providing, by the one or more processors, the second graphical panel of the plurality of graphical panels for display on the graphical user interface based on the third input, the second graphical panel including a second plurality of virtual buttons representing-graphical representations of a second set of items, the one or more processors storing the first input and the second input while the second graphical panel is displayed on the graphical user interface, the second graphical panel replacing the first graphical panel for display on the client device.

2. The computer-implemented method of claim 1, further comprising:
generating, by the one or more processors, a graphical summary indicating selection of the first item and the second item from the first graphical panel and the second graphical panel; and
providing, by the one or more processors, the graphical summary indicating the selection of the first item and the second item for display on the client device via the graphical user interface.

3. The computer-implemented method of claim 1, further comprising:
responsive to receiving the first input, providing, by the one or more processors, a graphical list of quantities at a first location in the graphical user interface, wherein the first location is based on a second location of the first virtual button-in the graphical user interface.

4. The computer-implemented method of claim 3, further comprising:
receiving, by the one or more processors, a fourth input identifying a selected quantity from the graphical list of quantities; and
responsive to receiving the fourth input, modifying, by the one or more processors, the first virtual button by overlaying a graphical illustration of the selected quantity over the first virtual button.

5. The computer-implemented method of claim 1, further comprising:
identifying, by the one or more processors, a first zone of a physical location;
determining, by the one or more processors, the first graphical panel and the first set of items based on an association of the first set of items with the first zone of the physical location; and
providing, by the one or more processors, the first graphical panel for display on the graphical user interface based on the identification of the first zone.

6. The computer-implemented method of claim 5, wherein:
the first zone is identified by the one or more processors based on a signal received by the one or more processors from a beacon located at the physical location.

7. The computer-implemented method of claim 5, wherein:
the first zone is identified by the one or more processors based on one or more graphical panel selection elements.

8. The computer-implemented method of claim 1, further comprising:
determining, by the one or more processors, a zone of a physical location from among a plurality of zones of the physical location, the zone being associated with the plurality of graphical panels, each of the plurality of graphical panels being associated with a category, each category being associated with a set of items; and
determining, by the one or more processors, the first graphical panel from among the plurality of graphical panels based on the determined zone and a selected category, the selected category including the first set of items.

9. The computer-implemented method of claim 1, further comprising:
determining, by the one or more processors, the order status of the first item; and
modifying, by the one or more processors, the first virtual button to indicate the order status of the first item including overlaying a third graphical representation of the order status over the first virtual button-.

10. A system comprising:
one or more processors; and
a computer readable memory storing instructions that, when executed by the one or more processors, cause the system to perform operations comprising:
generating a graphical user interface including a first graphical panel, the first graphical panel including a first plurality of virtual buttons, each of the first plurality of virtual buttons including a graphical representation representing an item of a first set of items, the graphical user interface allowing the first graphical panel to be selected from a plurality of graphical panels, the plurality of graphical panels including the first graphical panel the first graphical panel being displayed on a client device;
modifying two or more virtual buttons of the first plurality of virtual buttons including overlaying a graphical information indicator over each of the two or more virtual buttons based on a selection of each of the two or more virtual buttons, wherein modifying the two or more virtual buttons includes:
receiving a first input selecting a first virtual button representing a first item from the first plurality of virtual buttons;
modifying the first virtual button to indicate that the first item has been selected based on the first input including overlaying a first graphical information indicator over the first virtual button, the first graphical information indicator indicating one or more of a quantity and an order status associated with the selection of the first item;
receiving a second input selecting a second virtual button representing-a second item from the first plurality of virtual buttons; and
modifying the second virtual button to indicate that the second item has been selected based on the second input including overlaying a second graphical information indicator over the second virtual button, the first virtual button and the second virtual button simultaneously respectively indicating the selection of the first item and the second item;
receiving a third input selecting a second graphical panel of the plurality of graphical panels; and
providing the second graphical panel of the plurality of graphical panels for display on the graphical user interface based on the third input, the second graphical panel including a second plurality of virtual buttons representing a second set of items, the one or more processors storing the first input and the second input while the second graphical panel is displayed on the graphical user interface, the second graphical panel replacing the first graphical panel for display on the client device.

11. The system of claim 10, wherein the operations further comprise:
generating a graphical summary indicating a selection of the first item and the second item from the first graphical panel and the second graphical panel; and
providing the graphical summary indicating the selection of the first item and the second item for display on the client device via the graphical user interface.

12. The system of claim 10, wherein the operations further comprise:
responsive to receiving the first input, providing a graphical list of quantities at a first location in the graphical user interface, wherein the first location is based on a second location of the first virtual button in the graphical user interface.

13. The system of claim 12, wherein the operations further comprise:
receiving a fourth input identifying a selected quantity from the graphical list of quantities; and
responsive to receiving the fourth input, modifying the first virtual button by overlaying a graphical illustration of the selected quantity over the first virtual button.

14. The system of claim 10, wherein the operations further comprise:
identifying a first zone of a physical location;
determining the first graphical panel and the first set of items based on an association of the first set of items with the first zone of the physical location; and
providing the first graphical panel for display on the graphical user interface based on the identification of the first zone.

15. The system of claim 14, wherein:
the first zone is identified by the one or more processors based on a signal received by the one or more processors from a beacon located at the physical location.

16. The system of claim 14, wherein:
the first zone is identified by the one or more processors based on one or more graphical panel selection elements.

17. The system of claim 10, wherein the operations further comprise:
determining a zone of a physical location from among a plurality of zones of the physical location, the zone being associated with the plurality of graphical panels, each of the plurality of graphical panels being associated with a category, each category being associated with a set of items; and
determining the first graphical panel from among the plurality of graphical panels based on the determined zone and a selected category, the selected category including the first set of items.

18. The system of claim 10, wherein the operations further comprise:
determining the order status of the first item; and
modifying the first virtual button to indicate the order status of the first item including overlaying a third graphical representation of the order status over the first virtual button.

19. A computer-implemented method comprising:
generating, by one or more processors, a graphical user interface including a first graphical panel, the first graphical panel including a first plurality of virtual buttons, each of the first plurality of virtual buttons including a graphical representation representing an item of a first set of items, the graphical user interface allowing the first graphical panel to be selected from a plurality of graphical panels, the plurality of graphical panels including the first graphical panel, the graphical user interface being displayed on a client device;
modifying, by the one or more processors, two or more virtual buttons of the first plurality of virtual buttons including overlaying a graphical information indicator over each of the two or more virtual buttons based on a selection of each of the two or more virtual buttons, wherein modifying the two or more virtual buttons includes:
receiving, by the one or more processors, a plurality of user inputs selecting the two or more virtual buttons from among the first plurality of virtual buttons;

determining, by the one or more processors, an information item for each item associated with the two or more virtual buttons; and modifying, by the one or more processors, each of the two or more virtual buttons-including simultaneously overlaying a graphical information indicator indicating the information item over the respective virtual button of the two or more virtual buttons;

receiving, by the one or more processors, a third input selecting one or more graphical panel selection elements; and providing, by the one or more processors, a second graphical panel of the plurality of graphical panels for display on the graphical user interface based on the third input, the second graphical panel including a second plurality of virtual buttons representing a second set of items.

20. The computer-implemented method of claim 19, wherein:

determining the information item for each item includes determining a status of an order corresponding to each item; and overlaying the graphical information indicators over the two or more virtual buttons includes simultaneously overlaying the status of each order over the corresponding virtual button.

* * * * *